(12) United States Patent
Okamoto et al.

(10) Patent No.: US 10,378,963 B2
(45) Date of Patent: Aug. 13, 2019

(54) OPTICAL SYSTEM PHASE ACQUISITION METHOD AND OPTICAL SYSTEM EVALUATION METHOD

(71) Applicant: USHIO DENKI KABUSHIKI KAISHA, Tokyo (JP)

(72) Inventors: Masashi Okamoto, Tokyo (JP); Tsukasa Matsuo, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 12 days.

(21) Appl. No.: 15/626,417

(22) Filed: Jun. 19, 2017

(65) Prior Publication Data

US 2017/0370780 A1 Dec. 28, 2017

(30) Foreign Application Priority Data

Jun. 24, 2016 (JP) .................................. 2016-125384
Feb. 20, 2017 (JP) .................................. 2017-029096

(51) Int. Cl.
*G03H 1/08* (2006.01)
*G01J 9/02* (2006.01)
*G03H 1/04* (2006.01)
*G01J 9/00* (2006.01)

(52) U.S. Cl.
CPC ............... *G01J 9/02* (2013.01); *G03H 1/041* (2013.01); *G03H 1/0443* (2013.01); *G03H 1/0866* (2013.01); *G01J 2009/002* (2013.01); *G03H 2001/045* (2013.01);

(Continued)

(58) Field of Classification Search
CPC ...... G01J 9/02; G01J 2009/002; G03H 1/041; G03H 1/0866; G03H 1/0443; G03H 2001/0445; G03H 2001/0452; G03H 2001/045; G03H 2226/11; G03H 2226/02
See application file for complete search history.

(56) References Cited

U.S. PATENT DOCUMENTS 7,649,160 B2    1/2010  Colomb et al.
8,841,591 B2 *  9/2014  Wilde ............... G01B 9/02047
                                                   250/201.9
2008/0259345 A1 10/2008  Fukutaka

FOREIGN PATENT DOCUMENTS

JP    2002-526815 A    8/2002
JP    2003-098040 A    4/2003
(Continued)

*Primary Examiner* — Hwa Andrew Lee
(74) *Attorney, Agent, or Firm* — Studebaker & Brackett PC

(57) ABSTRACT

When the optical system is illuminated with an illumination light flux emitted from one extant input image point, an interference image generated by superimposing an extant output light flux output from the optical system and a reference light flux coherent with the extant output light flux is imaged to acquire interference image data, and thus to acquire measured phase distribution, and this acquisition operation is applied to each extant input image point. Thus, each measured phase distribution is expanded by expanding functions $\mu n(u, v)$ having coordinates $(u, v)$ on a phase defining plane as a variable to be represented as a sum with coefficients $\Sigma n\{Ajn \cdot \mu n(u, v)\}$. When the optical system is illuminated with a virtual illumination light flux, a phase $\Psi(u, v)$ of a virtual output light flux is determined by performing interpolation calculation based on coordinates of a virtual light emitting point.

7 Claims, 7 Drawing Sheets

(52) U.S. Cl.
CPC ............... *G03H 2001/0445* (2013.01); *G03H 2001/0452* (2013.01); *G03H 2226/02* (2013.01); *G03H 2226/11* (2013.01)

(56) References Cited

FOREIGN PATENT DOCUMENTS

| | | |
|---|---|---|
| WO | 00/20929 A1 | 4/2000 |
| WO | 2008/123408 A1 | 10/2008 |

* cited by examiner

Fig. 7a

$$\Psi_{(\rho,\theta)} = \sum_{n=0}^{N} \sum_{m=-n}^{n} A_{nm} \cdot Z_{nm(\rho,\theta)}$$

($n$-$m$ : Even number)

Fig. 7b

$$Z_{nm(\rho,\theta)} = R_{nm(\rho)} \cdot f_{m(\theta)}$$

Fig. 7c

$$R_{nm(\rho)} = \sum_{s=0}^{\frac{n-m}{2}} (-1)^s \frac{(n-s)!}{s! \cdot \left(\frac{n+m}{2} - s\right)! \cdot \left(\frac{n-m}{2} - s\right)!} \rho^{n-2s}$$

$\left(\frac{n+m}{2} - s \geq 0\right)$

Fig. 7d

$$f_{m(\theta)} = \begin{cases} \cos m\theta & (m > 0) \\ 1 & (m = 0) \\ \sin m\theta & (m < 0) \end{cases}$$

OPTICAL SYSTEM PHASE ACQUISITION METHOD AND OPTICAL SYSTEM EVALUATION METHOD

BACKGROUND OF THE INVENTION

Field of the Invention

The present invention uses a technology used in so-called digital holographic imaging, and in a realistic image forming optical system, this invention relates to a method of acquiring an optical phase and the distribution of the optical phase on, for example, an exit pupil plane of the optical system that is useful when the optical system is evaluated. The realistic image forming optical system is configured by, for example, coaxially arranging one or more image forming optical elements such as a lens having a refractive surface of a concave surface or a convex surface, a lens (GRIN lens) achieved by the fact that a refractive medium has a specific refractive index distribution, and a mirror having a reflective surface of a concave surface or a convex surface. In this method, extant input image points located at prescribed extant input image spatial coordinates are actually input to obtain interference image data with respect to each extant input image point; however, while the number of the extant input image points is suppressed within a range where the interference image data can be economically obtained, in addition to aberration as designed, error in profile of a refractive surface or a reflective surface of each image forming optical element and internal presence of defects such as eccentricity, surface distance error, and assembly error such as tilt are included. Further, in this method, diffractive optical image forming simulation with respect to an arbitrary input image pattern is performed, for example, or OTF and Zernike expanding coefficients are calculated, whereby the optical system is evaluated.

By using the present method, when an image of an unrealistic arbitrary virtual input pattern is formed by a realistic optical system, an output pattern, a resolution, and so on can be confirmed through simulation. Therefore, this method is applicable to inspection of an image forming performance of a realistic optical system, for example.

Description of the Related Art

By virtue of the development of pixel densification in a recent imaging element such as CCD and MOS image sensor, the increase in the capacity of a storage of a calculator, and speeding up of calculation, a digital holographic imaging technology can be relatively easily applied.

The digital holographic imaging technology will be described here. In the original optical holography, a photographic plate on which a hologram interference fringe is recorded is developed, and an image of a stereoscopic image reconstructed by being illuminated with light having the same condition as that of reference light irradiated during recording is formed. In the digital holographic imaging technology, a hologram interference fringe is obtained as digital data by filming in use of an imaging element instead of the photographic plate. An optical phenomenon that may occur when the hologram interference fringe is irradiated with light is simulated using a computer, whereby a stereoscopic image is reconstructed.

As the contents of the simulation, a bright and dark pattern of an imaged hologram interference fringe is regarded as an optical filter whose light transmittance changes depending on a position on a plane. Assuming a case where this is irradiated with light, the transmitted light, that is, light subjected to amplitude modulation while depending on the position on the plane propagates in a space as wave motion, and light electric field distribution formed on a virtual plane defined at an arbitrary rear position is reconstructed including phase information.

Accordingly, when the position of the virtual plane is taken on an output image plane of an optical system, the real image or virtual image can be reconstructed and confirmed.

The light propagation is a diffraction phenomenon called a Fresnel diffraction or Fraunhofer diffraction according to propagation distance conditions, and although the simulation is performed by diffractive optical light propagation simulation in which a possible approximation is applied to the formula called Kirchhoff-Huygens diffraction integral formula, the simulation is usually formulated such that light wave motion is a light electric field of complex numbers (a vibration component depending on the time is omitted).

Note that, including history, a method of digital holographic imaging is described in WO2008/123408.

When evaluation of an image forming performance of a realistic image forming optical system is desired, in the prior art, a wide variety of test patterns have been input to evaluate the output image.

However, in order to evaluate an optical system from various viewpoints, it is expected that, instead of inputting many test patterns, light electric field distribution output when typical point images are input is previously acquired including phase information, and flexible evaluation is achieved by performing simulation with respect to a wide variety of conditions, including a virtual input pattern as a test pattern to be input. Thus, the digital holographic imaging technology can be applied thereto.

As an apparatus which evaluates an optical system with the use of the digital holographic imaging technology, JP-A-2003-098040 describes an evaluation apparatus which numerically reproduces a light wave passing through a tested optical system (lens) and obtaining light amount distribution of the light wave passing through the tested optical system on a plane substantially perpendicular to the optical axis.

It is further described that a beam diameter of the reproduced light wave and distribution profile are examined It is further described that ray tracing simulation is performed using surface form data of lens and internal refractive index distribution data of the lens together, thus obtaining equiphase plane data.

It is further described that the influence of birefringence inside the lens on a passage optical wavefront of the lens is examined based on a difference between the equiphase plane data, obtained by the ray tracing simulation based on the surface form data of the lens and the internal refractive index distribution data of the lens, and equiphase plane data of an optical wavefront reproduced based on hologram image data.

It is further described that the light wave passing through the tested optical system is numerically reproduced, and in an optical axis direction of the light wave passing through the tested optical system, light amount distribution of the light wave passing through the tested optical system on a plane substantially perpendicular to the optical axis is obtained.

It is further described that the overall influence of internal non-uniformity of each lens used in a scanning optical system on the light wave passing through the tested optical system is examined It is furthermore described that the overall influence of birefringence of each lens used in the optical system on the light wave passing through the tested optical system is examined JP-W-2002-526815 describes a technique of acquiring a phase contrast image by digital holographic imaging and multiplying a phase mask function in order to correct an aberration of a magnification or demagnification optical system.

U.S. Pat. No. 7,649,160 describes a technique of automatically or semi-automatically correcting defects of an image due to tilt of an optical axis for off-axis, aberration of an objective lens or the like, error in adjustment of an optical system, defocusing, hand movement, and so on with the use of digital wave front operation of digital holographic imaging.

As described above, the above prior arts merely evaluate physical characteristics inside an optical system, light quantity distribution of an output light flux, and so on with the use of the digital holographic imaging technology or correct defects of a taken image due to aberration of the optical system and defects of photographing conditions and thus cannot confirm and evaluate an output pattern, a resolution, and so on through simulation when an image of an arbitrary virtual input pattern is formed.

PRIOR ART DOCUMENTS

Patent Documents

Patent Document 1: WO 2008/123408
Patent Document 2: JP-A-2003-098040
Patent Document 3: JP-W-2002-526815
Patent Document 4: U.S. Pat. No. 7,649,160

BRIEF SUMMARY OF THE INVENTION

An object to be achieved by the present invention is to provide, in a realistic image forming optical system, a technique of acquiring an optical phase and the distribution of the optical phase that are useful when the optical system is evaluated. In this technique, extant input image points located at prescribed extant input image spatial coordinates are actually input to obtain interference image data with respect to each extant input image point; however, while the number of the extant input image points is suppressed within a range where the interference image data can be economically obtained, in addition to aberration as designed, error in profile of a refractive surface or a reflective surface of each image forming optical element and internal presence of defects such as eccentricity, surface distance error, and assembly error such as tilt are included. Further, in this method, diffractive optical image forming simulation with respect to an arbitrary input image pattern is performed, for example, or OTF and Zernike expanding coefficients are calculated, whereby the optical system is evaluated.

An optical system phase acquisition method according to the first invention of the present invention is a method of acquiring a phase of an optical system (Ot) constituted of one or more image forming optical elements.

This method is characterized by comprising: when the optical system (Ot) is illuminated with an illumination light flux (Fs1) emitted from one extant input image point (Ps1) located at prescribed extant input image spatial coordinates (xs1, ys1, zs1) with respect to an input side of the optical system (Ot), imaging, with an imaging element (Uf), an interference image generated by superimposing an extant output light flux output from the optical system (Ot) and a reference light flux (Fr) coherent with the extant output light flux to acquire interference image data (Df), and thus to acquire measured broad sense phase distribution $\Psi s1(u, v)$ belonging to the extant input image point (Ps1) on a phase defining plane (T) located at a prescribed relative position with respect to an output side of the optical system (Ot), based on the interference image data (Df) such that this acquisition operation is applied to each of the extant input image points (Ps1, Ps2, . . . , Psj, . . . ) located at the prescribed extant input image spatial coordinates (xs1, ys1, zs1), (xs2, ys2, zs2), . . . , (xsj, ysj, zsj), and . . . , thereby acquiring measured broad sense phase distributions $\Psi s1(u, v)$, $\Psi s2(u, v)$, . . . , $\Psi sj(u, v)$, and . . . belonging to each of the extant input image points (Ps1, Ps2, Psj, . . . ) on the phase defining plane (T);

acquiring a group of expanding coefficients Ajn belonging to the extant input image points (Ps1, Ps2, . . . , Psj, . . . ) and configured to expand each of the measured broad sense phase distributions $\Psi s1(u, v)$, $\Psi s2(u, v)$, . . . , $\Psi sj(u, v)$, and . . . by expanding functions $\mu n(u, v)$ having the coordinates (u, v) on the phase defining plane (T) as a variable and represent the resultant sum as a sum with coefficients $\Sigma n\{Ajn \cdot \mu n(u, v)\}$;

after the acquisition of the group of the expanding coefficients Ajn, with respect to a virtual light emitting point located at coordinates (x, y, z) in a virtual input image spatial coordinate system (x, y, z), in order to acquire a broad sense phase $\Psi(u, v)$ on the phase defining plane (T) of a virtual output light flux from the optical system (Ot) when the optical system (Ot) is illuminated with a virtual illumination light flux emitted from the virtual light emitting point, applying interpolation calculation to the group of the expanding coefficients Ajn based on the position occupied by the coordinates (x, y, z) at the virtual light emitting point among a set of the extant input image spatial coordinates (xs1, ys1, zs1), (xs2, ys2, zs2), . . . , (xsj, ysj, zsj), and . . . to previously calculate the group of interpolation expanding coefficients An; and giving a value of specific coordinates (u, v) on the phase defining plane (T) to determine the broad sense phase $\Psi(u, v)$ by the sum with coefficients $\Sigma n\{Ajn \cdot \mu n(u, V)\}$ of the expanding functions $\mu n(u, v)$.

An optical system phase acquisition method according to the second invention of the present invention is a method of acquiring a phase of an optical system (Ot) constituted of one or more image forming optical elements.

This method is characterized by comprising: when the optical system (Ot) is illuminated with an illumination light flux (Fs1) emitted from one extant input image point (Ps1) located at prescribed extant input image spatial coordinates (xs1, ys1, zs1) with respect to an input side of the optical system (Ot), imaging, with an imaging element (Uf), an interference image generated by superimposing an extant output light flux output from the optical system (Ot) and a reference light flux (Fr) coherent with the extant output light flux to acquire interference image data (Df), and thus to acquire measured broad sense phase distribution $\Psi s1(u, v)$ belonging to the extant input image point (Ps 1) on a phase defining plane (T) located at a prescribed relative position with respect to an output side of the optical system (Ot), based on the interference image data (Df) such that this acquisition operation is applied to each of the extant input image points (Ps1, Ps2, . . . , Psj, . . . ) located at the prescribed extant input image spatial coordinates (xs1, ys1, zs1), (xs2, ys2, zs2), (xsj, ysj, zsj), and . . . , thereby acquiring measured broad sense phase distributions $\Psi s1(u, v)$, $\Psi s2(u, v)$, . . . , $\Psi sj(u, v)$, and . . . belonging to each of the extant input image points (Ps1, Ps2, . . . , Psj, . . . ) on the phase defining plane (T);

acquiring a group of expanding coefficients Ajn belonging to the extant input image points (Ps1, Ps2, . . . , Psj, . . . ) and configured to expand each of the measured broad sense phase distributions Ψs1(u, v), Ψs2(u, v), . . . , Ψsj(u, v), and . . . by expanding functions μn(u, v) having the coordinates (u, v) on the phase defining plane (T) as a variable and represent the resultant sum as a sum with coefficients Σn{Ajn·μn(u, v)};

calculating an optical path length Γ1(u, v) from an input image point (Pt1) corresponding to the extant input image point (Ps1) to the phase defining plane (T) through ray tracing simulation of rays emitted from the input image point (Pt1), based on design data of the optical system (Ot) to acquire traced calculated broad sense phase distribution Ψt1(u, v) belonging to the extant input image point (Ps1) on the phase defining plane (T) based on the optical path length Γ1(u, v) such that this calculation is applied to each of the input image points (Pt1, Pt2, . . . Ptj, . . . ) corresponding to the extant input image points (Ps1, Ps2, Psj, . . . ), thereby acquiring the traced calculated broad sense phase distributions Ψt1(u, v), Ψt2(u, v), . . . , Ψtj(u, v), and . . . belonging to each of the extant input image points (Ps1, Ps2, . . . , Psj, . . . ) on the phase defining plane (T);

acquiring a group of expanding coefficients Bjn belonging to the input image points (Pt1, Pt2, . . . , Ptj, . . . ) and configured to expand each of the traced calculated broad sense phase distributions Ψt1(u, v), Ψt2(u, v), . . . , Ψtj(u, v), and . . . by expanding functions μn(u, v) having the coordinates (u, v) on the phase defining plane (T) as a variable and represent the resultant sum as a sum with coefficients Σn{Bjn·μn(u, v)};

through calculation by a difference Ajn−Bjn, acquiring expanding coefficients Δjn configured to represent, as a sum with coefficients Σn{Δjn·μn(u, v)}, each of broad sense phase difference distributions . . . , Ψsj(u, v)−Ψtj(u, v), and . . . which are each a difference between the measured broad sense phase distribution and the traced calculated broad sense phase distribution;

after the acquisition of the expanding coefficients Δjn, with respect to a virtual light emitting point located at coordinates (x, y, z) in a virtual input image spatial coordinate system (x, y, z), in order to acquire a broad sense phase Ψ(u, v) on the phase defining plane (T) of a virtual output light flux from the optical system (Ot) when the optical system (Ot) is illuminated with a virtual illumination light flux emitted from the virtual light emitting point, first applying interpolation calculation to the group of the expanding coefficients Δjn based on the position occupied by the coordinates (x, y, z) at the virtual light emitting point among a set of the extant input image spatial coordinates (xs1, ys1, zs1), (xs2, ys2, zs2), . . . , (xsj, ysj, zsj), and . . . to previously calculate the group of interpolation expanding coefficients Δn;

then calculating an optical path length Γ(u, v) from a virtual light emitting point located at coordinates (x, y, z) to the phase defining plane (T) through ray tracing simulation of rays emitted from the virtual light emitting point located at the coordinates (x, y, z), based on design data of the optical system (Ot) to acquire an ideal broad sense phase Ψ'(u, v) on the phase defining plane (T) based on the optical path length Γ(u, v); and giving, as a correction thereto, a value of specific coordinates (u, v) on the phase defining plane (T) to calculate a broad sense phase difference δΨ(u, v) which is a difference between the measured broad sense phase and the traced calculated broad sense phase by the sum with coefficients Σn{Δjn·μn(u, v)} of the expanding functions μn(u, v) and thus to determine the broad sense phase Ψ(u, v) as a sum Ψ'(u, v)+δΨ(u, v) of the ideal broad sense phase Ψ'(u, v) and the broad sense phase difference δΨ(u, v).

An optical system phase acquisition method according to the third invention of the present invention is characterized in that in the process for acquiring the measured broad sense phase distributions Ψs1(u, v), Ψs2(u, v), and . . . belonging to each of the extant input image points (Ps1, Ps2, and . . . ), the extant input image points (Ps1, Ps2, and . . . ) are each divided to acquire the interference image data (Df).

An optical system phase acquisition method according to the fourth invention of the present invention is characterized in that in the process for acquiring the measured broad sense phase distributions Ψs1(u, v), Ψs2(u, v), and . . . belonging to each of the extant input image points (Ps1, Ps2, and . . . ), after acquisition of the interference image data (Df) collectively including information of interference images about all the extant input image points (Ps1, Ps2, and . . . ), the interference image data (Df) is separated into the measured broad sense phase distributions Ψs1(u, v), Ψs2(u, v), and . . . .

An optical system phase acquisition method according to the fifth invention of the present invention is characterized in that a relay optical system (Oq) is inserted between the optical system (Ot) and the imaging element (Uf) so that an extant output light flux output from the optical system (Ot) is input to the relay optical system (Oq), and the relay optical system (Oq) outputs a relay output light flux which is an output light flux from the relay optical system (Oq), and a target in which an interference image generated by superimposing the reference light flux (Fr) is imaged by the imaging element (Uf) is replaced with the extant output light flux output from the optical system (Ot) to provide the relay output light flux.

An optical system phase acquisition method according to the sixth invention of the present invention is characterized in that the expanding by coefficients is Zernike polynomial expanding.

An optical system evaluation method according to the seventh invention of the present invention is a method of performing evaluation through image forming simulation of the optical system (Ot).

This method is characterized by comprising: when a virtual input pattern to be subjected to the image forming simulation is represented by a set of virtual light emitting points located at coordinates (x1, y1, z1), (x2, y2, z2), and . . . in a virtual input image spatial coordinate system (x, y, z), determining broad sense phase distributions Ψ1(u, v), Ψ2(u, v), and . . . on the phase defining plane (T) with respect to the virtual light emitting points located at the coordinates (x1, y1, z1), (x2, y2, z2), and . . . included in the set of the virtual light emitting points, by the method described in the first to second invention, that is, the method of acquiring the broad sense phase Ψ(u, v) on the phase defining plane (T) with respect to the virtual light emitting point located at the coordinates (x, y, z); and performing diffractive optical light propagation simulation from the phase defining plane (T) to a prescribed output image plane (Ho) to calculate light electric field distributions e1(X, Y), e2(X, Y), and . . . on the output image plane (Ho) formed by each of the virtual light emitting points located at the coordinates (x1, y1, z1), (x2, y2, z2), and . . . ; and superposing the light electric field distributions e1(X, Y), e2(X, Y), and . . . to acquire an output pattern.

An optical system evaluation method according to the eighth invention of the present invention is a method of evaluating the optical system (Ot).

This method is characterized by comprising: determining a broad sense phase distribution $\Psi r(u, v)$ on the phase defining plane (T) with respect to virtual light emitting point located at coordinates (xr, yr, zr) by the method described in the first to second invention, that is, the method of acquiring the broad sense phase $\Psi(u, v)$ on the phase defining plane (T) with respect to the virtual light emitting point located at the coordinates (x, y, z);

determining optical path length aberration distribution H(U, V) on an aberration defining virtual plane arbitrarily provided, based on an optical path length from a position of coordinates (U, V) on the aberration definition virtual plane to an ideal output image point located at coordinates (Xr, Yr, Zr) conjugate to the virtual light emitting point located at the coordinates (xr, yr, zr) and the broad sense phase distribution $\Psi r(u, v)$; and evaluating the optical system (Ot) based on the optical path length aberration distribution H(U, V).

Here, the above-described broad sense phase will be additionally explained.

For example, when saying "phase distribution of light", it is premised that the light electric field is coherent on the plane. If a coordinate system is provided on the plane, it means that such information that a phase of light wave motion at a point of a certain coordinate is delayed by $\pi/2$, for example, based on, for example, a phase of light wave motion at its original point exists and is distributed at each coordinate point.

To realize such a situation, it is considered that when a point light source is a source, light wave motion emitted from the source extends to propagate through a lens and a reflector and thus to reach each point on the plane.

At this time, considering an optical path length of a path through which the light wave motion has propagated from the point light source to each coordinate point, it proves that a value of the optical path length is distributed on the plane.

In view of this, a difference in the value of the optical path length at each coordinate point based on the value of the optical path length at the origin of the coordinates of the plane, that is, distribution of an optical path length difference can be considered.

Distribution of a value obtained by multiplying a value of the optical path length difference, distributed on the above plane, by $k=2\pi/\lambda$ is phase distribution of light. Here, $\lambda$ is a light wavelength in vacuum.

Accordingly, when distribution of a phase on a plane is measured using a holography technology, for example, a difference between either holding or calculating this distribution as distribution information of the phase, or holding or calculating the distribution as distribution information of an optical path length difference is not essential. As described above, since the phase and the optical path length difference can be always mutually converted by multiplying or dividing a value of wavenumber, they are considered to be equivalent information.

Thus, in this invention, information equivalent to the phase such as the optical path length difference is referred to as the broad sense phase.

However, in the following description, for ease of explanation, the broad sense phase is simply referred to as a phase except for the case where distinction is particularly needed.

Incidentally, like a laser, in the case of a light source which directly generates substantially parallel light beams without using a point light source as the source, an optical path length of a propagation path of light from an equiphase plane existing in a laser device may be considered, or when a virtual point light source is considered, the case where light from this light source is collimated by a lens to generate a beam may be alternatively considered; therefore, handling due to the optical path length is effective.

Further, the above coordinates will be additionally explained.

In the above description, it is described that, for example, "expand . . . by expanding functions $\mu n(u, v)$ having the coordinates (u, v) on the phase defining plane (T) as a variable . . . ", and in addition, in the drawings to be referred to below, the coordinate system is illustrated as an orthogonal coordinate system. However, the method of this invention is not limited to handling by the orthogonal coordinate system, and a polar coordinate system or other coordinate systems can be partially incorporated or entirely adopted on the ground that mathematical handling becomes easy, for example.

In a realistic image forming optical system, this invention can provide a technique of acquiring an optical phase and the distribution of the optical phase that are useful when the optical system is evaluated. In this technique, extant input image points located at prescribed extant input image spatial coordinates are actually input to obtain interference image data with respect to each extant input image point; however, while the number of the extant input image points is suppressed within a range where the interference image data can be economically obtained, in addition to aberration as designed, error in profile of a refractive surface or a reflective surface of each image forming optical element and internal presence of defects such as eccentricity, surface distance error, and assembly error such as tilt are included. Further, in this technique, diffractive optical image forming simulation with respect to an arbitrary input image pattern is performed, for example, or OTF and Zernike expanding coefficients are calculated, whereby the optical system is evaluated.

BRIEF DESCRIPTION OF THE SEVERAL VIEWS OF THE DRAWINGS

FIGS. 7a to 7d are schematic diagrams of a concept associated with the technique of the optical system phase acquisition method of this invention.

DETAILED DESCRIPTION OF THE INVENTION

Figure 1:
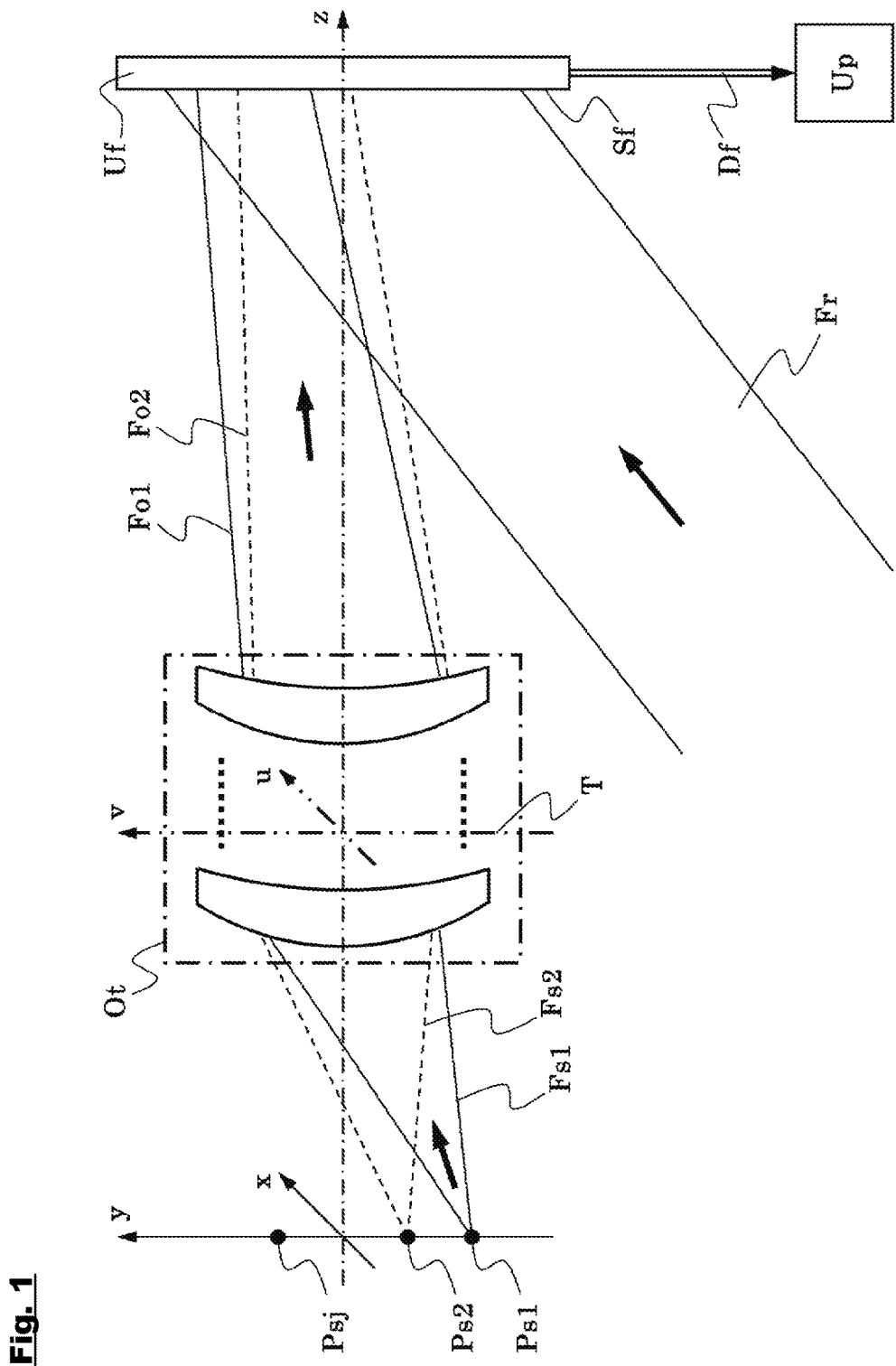
FIG. 1 is a block diagram of a configuration associated with a technique of an optical system phase acquisition method of the present invention.

Before describing the specific details of the present invention, in order to aid in the understanding of this invention, the technical idea of this invention will be briefly described.

As described above, light electric field distribution output when typical point images are input to a realistic optical system is previously acquired by the digital holographic imaging technology, including phase information, and when an arbitrary virtual input pattern is simulated, information of a phase of an output light on a phase defining plane to be described later, corresponding to all point images constituting a virtual input pattern is required.

However, naturally, among point images constituting the virtual input pattern, there should be too many point images not included in a set of actually input typical point images, and information on a phase of output light corresponding to such a point image should be generated during simulation. In this invention, interpolation calculation from information held thereby is utilized.

However, phase distribution on the phase defining plane is information having a value at each point on a two-dimensional plane. When the phase distribution is handled as it is as a two-dimensional arrangement in a similar form to that of data consisting of many pixels and acquired by imaging by the above-described imaging element, the amount of held data and the amount of calculation to be processed become very large. Therefore, the phase distribution is expanded by coefficients having coordinates on the phase defining plane as a variable.

Accordingly, in information on the phase distribution corresponding to each of the actually input typical point images, only expanding coefficients in the expanding by coefficients, that is, only a set of the expanding coefficients is held, and when a phase corresponding to each point image constituting a virtual input pattern is acquired during simulation, a suitable set is selected from sets of groups of the expanding coefficients belonging to the actually input typical point images. When a group of new expanding coefficients is generated by interpolation calculation depending on a position of the point image constituting the virtual input pattern, a value of a phase at arbitrary coordinates on the phase defining plane can be calculated using the group of the expanding coefficients and the expanding functions.

In the description of this invention, image formation denotes a phenomenon in which with respect to an input image of a real image or a virtual image at finite distance or at infinity, an optical system generates an output image of the real image or the virtual image at finite distance or at infinity.

The term "conjugate", for example, when it is described as "A and B are conjugate to each other" as a general term in the field of geometric optics, means that an image of A is formed on B or an image of B is formed on A as a result of a function of an optical device, such as a lens, having an imaging function, at least on the basis of paraxial theory. In this case, A and B are images that obviously encompass an isolated point image as a target, and also encompass, as a target, a set of point images as well as an image having an extent in which point images are distributed in a continuous manner.

Here, as a general term in the field of geometric optics, "point image" or "image point" (i.e., "image") encompasses any of: a point that actually emits light therefrom; a point toward which light is converged and that causes a bright point to be shown on a screen when the screen is disposed thereat; a point toward which light is seen as if to be converged (but a screen is not allowed to be disposed thereat because the point is inside an optical system); and a point from which light is seen as if to be emitted (but a screen is not allowed to be disposed thereat because the point is inside an optical system). "Point image" or "image point" (i.e. "image") is used without distinguishing the above-mentioned points one from another.

Taking, as an example, a general camera lens in which an aperture stop typically exists inside the lens, an image of the aperture stop viewed through the lens when the lens is viewed from the light entering side is called an entrance pupil, an image of the aperture stop viewed through the lens when the lens is viewed from the light exiting side is called an exit pupil, and a ray (usually meridional ray) that travels toward the center of the entrance pupil or that travels out from the center of the exit pupil is called a principal ray.

Further, rays other than the principal ray are called marginal rays in a broad sense.

However, an optical system that uses light having directivity such as laser light has no necessity to extract a bundle of rays by the aperture stop, and may therefore have no aperture stop therein in many cases. In such a case, they are defined depending on an existence form of light in the optical system.

Typically, a central ray of directional distribution of light in a bundle of rays emitted from the emission point is considered the principal ray. The entrance pupil is considered to be located at a position where the principal ray entering the optical system or an extension thereof intersects the optical axis, and the exit pupil is considered to be located at a position where the principal ray exiting the optical system or an extension thereof intersects the optical axis.

However, in a precise sense, it is conceivable that the principal ray as defined above and the optical axis do not intersect each other, for example, as a result of adjustment error, and may only be skew in some cases.

However, such a phenomenon has no relation to the essence and is worthless to argue. In the description below, it is therefore assumed that such a phenomenon does not occur, or it is assumed that the principal ray and the optical axis intersect each other at a position where the principal ray and the optical axis are closest to each other.

Moreover, when paying attention to two adjacent partial optical systems A and B in the optical system where B is provided immediately downstream of A to be adjacent thereto, an exit pupil of A serves as an entrance pupil of B (in a manner similar to a manner in which an output image of A serves as an input image of B). Further, in the first place, all of the entrance pupils and the exit pupils of arbitrarily-defined partial optical systems in the optical system should be conjugate to one another (all of the entrance pupils and the exit pupils of the arbitrarily-defined partial optical systems are an image of the aperture stop where the aperture stop is provided, or are conjugate to one another even when no aperture stop is provided). For this reason, the entrance pupil and the exit pupil are simply referred to as "pupil" in the absence of the necessity to particularly distinguish one from the other.

Unless particularly contextually limited, the appellation of rays is considered to be used in a broad sense. For example, a ray coinciding with an optical axis is considered to be one type of meridional ray, and the meridional ray is considered to be one type of skew ray.

In the description of some embodiments of the invention and the drawings, the optical axis of the optical system is referred to as "z axis". However, in a case where the optical axis is bent by a reflector, a direction in which a ray that has been along the original z axis is reflected to travel is also referred to as "z axis", and no coordinate axis is newly provided therefore.

First, referring to FIG. 1 which is a block diagram of a configuration associated with a technique of an optical system phase acquisition method of the present invention, an embodiment for carrying out an optical system phase acquisition method according to the first invention will be described.

As described above, for the purpose of achieving acquisition of phases corresponding to point images constituting a virtual input pattern in simulation, in order to achieve acquisition of the light electric field distribution to be output, including phase information, by the digital holographic imaging technology, positions of typical point images to be actually input, that is, extant input image points (Ps1, Ps2, . . . , Psj, . . . ) are determined to be distributed in a region where the point images constituting the virtual input pattern are distributed and at an outer peripheral portion (if possible, slightly outside an outer circumference boundary) at a suitable density.

When determining the positions, even if an optical system (Ot) as a target for phase acquisition is designed axisymmetrically, it is preferable to determine the positions such that image points are arranged with respect to all the four quadrants around the axis without assuming axisymmetry.

This is because phase distribution is affected by machining error and assembly error of a refractive surface or a reflective surface in the optical system (Ot).

In the drawings, although all the extant input image points (Ps1, Ps2, . . . , Psj, . . . ) are arranged on the y axis for ease of drawing, they may be arranged on a plane perpendicular to the z axis, such as an xy plane, or may be arranged three-dimensionally.

Based on determination of the positions of the extant input image points (Ps1, Ps2, . . . , Psj, . . . ), that is, extant input image spatial coordinates (xs1, ys1, zs1), (xs2, ys2, zs2), . . . , (xsj, ysj, zsj), one of the extant input image points (Ps1) is provided at the position of the prescribed extant input image spatial coordinates (xs1, ys1, zs1) with respect to an input side of the optical system (Ot).

The extant input image point (Ps1) can be realized by a secondary light emitting point generated by applying a light flux from a primary coherence light source, such as a laser, to a mask plate having a pin hole therethrough or a convex or concave lens.

Then, an illumination light flux (Fs1) from the extant input image point (Ps1) is input to the optical system (Ot) to generate an extant output light flux (Fo1), and the extant output light flux (Fo1) is applied to an imaging surface (Sf) of an imaging element (Uf) including a CCD and a CMOS image sensor.

In this embodiment, an "object" in the holography technology corresponds to the optical system (Ot), "illumination light" corresponds to the illumination light flux (Fs1), and "object light" corresponds to the extant output light flux (Fo1).

In the drawings, the illumination light flux (Fs2) and the extant output light flux (Fo2) are shown by dashed lines because the illumination light flux (Fs1) is easily distinguished from the extant output light flux (Fo1).

A reference light flux (Fr) which is generated by dividing the light flux from the primary coherence light source and is coherent with the extant output light flux (Fo1) is applied to the imaging surface (Sf) so as to be superimposed with the extant output light flux (Fo1).

Consequently, since an interference image including interference fringes generated by interference between the extant output light flux (Fo1) and the reference light flux (Fr), the interference image is imaged by the imaging element (Uf), and a processing apparatus (Up) receives and stores interference image data (Df) thus obtained.

The processing apparatus (Up) acquires, based on the interference image data (Df), a phase distribution of a light electric field depending on the coordinates (u, v) on a phase defining plane (T) located at a prescribed relative position with respect to an output side of the optical system (Ot), that is, a measured phase distribution $\Psi s1(u, v)$. In the above description that "measured phase distribution $\Psi s1(u, v)$ belonging to the extant input image point (Ps1)", the expression "belonging" reflects the circumstance that the measured phase distribution $\Psi s1(u, v)$ is determined by determining the position of the extant input image point (Ps1).

Here, the phase defining plane (T) is a plane determining a phase when the phase is acquired in this invention, and the position, shape (plane, sphere, or the like), and so on (if the phase defining plane (T) has a plane shape, inclination to the optical axis is included, and if it has a sphere shape, the radius, the center position, and so on are included) can be arbitrarily determined according to the object of the phase acquisition.

However, usually an exit pupil of the optical system (Ot) which can be considered that the position and the shape are not affected by the position of the extant input image point and do not change is often adopted as the phase defining plane (T), and therefore, in the following description in this specification, the embodiment will be described, bearing in mind a case where the phase defining plane (T) is taken in the exit pupil of the optical system (Ot).

Although the interference image data (Df) is an interference image on the imaging surface (Sf), that is, a multi-gradation bright and dark pattern of an interference fringe image, this can be converted into a phase distribution in the light electric field on the imaging surface (Sf). The conversion method is known as a Fourier-transform method (reference: Takeda, M., et al.: Fourier-transform method of fringe-pattern analysis for computer-based topography and interferometry, J. Opt. Soc. Am, Vol. 72, No. 1 (1982), pp. 156-160).

When the phase defining plane (T) is located on a further rear side than a final refractive surface of the optical system (Ot) and allowed to coincide with the imaging surface (Sf), a phase distribution calculated by the above conversion method may be used as the measured phase distribution $\Psi s1(u, v)$.

However, since the phase defining plane (T), that is, the exit pupil is usually provided inside the optical system (Ot), in this case the measured phase distribution $\Psi s1(u, v)$ on the phase defining plane (T) may be calculated by diffractive optical light propagation simulation in which the light electric field of the phase distribution calculated by the conversion method is propagated in a direction opposite to an original light traveling direction from the imaging surface (Sf) to the phase defining plane (T).

Although the phase usually falls within a range of 0 to $2\pi$, if this range is compelled against a phase distributed on a plane, a portion where a phase value rapidly changes appears linearly even when the phase actually smoothly changes.

Since the phase represents a degree of relative delay/advance of a wave motion at a certain point with respect to a wave motion at a point determined as a reference, a rapid change in phase value is not essential.

Since the phase distribution of light wave motion on a plane is derived from the optical path length of a path of light having propagated from a point light source to the plane, it should be correct that a change that exceeds the range of 0 to $2\pi$ is allowed, and correction is performed to prevent the rapid change.

Such correction processing is called phase unwrapping. Since a change in phase distribution on the phase defining plane (T) is smooth, phase unwrapping correction processing can be relatively easily applied to the measured phase distribution Ψs1(u, v).

FIG. 1 will be briefly supplemented below. Although FIG. 1 illustrates that the extant output light flux (Fo1) and the reference light flux (Fr) are directly applied to the imaging element (Uf) from different directions to be superimposed, they are usually multiplexed using a beam splitter to be often superimposed.

Although FIG. 1 illustrates that the illumination light flux (Fs1) and the reference light flux (Fr) are independent, since they should be coherent, they are usually generated from a common light source.

The reference light flux (Fr) may be generated by applying a spatial frequency filter which removes components other than a spatial DC component to the illumination light flux (Fs1).

The processing apparatus (Up) can be realized by a computer including an interface and a CPU configured to receive the interference image data (Df) from the imaging element (Uf), a nonvolatile memory which stores the interference image data (Df), OS, and processing programs required for calculation, and the volative memory which is loaded with the OS and the processing programs required for calculation and stores data required for execution of processing and calculation. The processing apparatus (Up) can read out the stored interference image data (Df) and execute calculation based on the digital holographic imaging technology.

The calculation contents in the digital holography imaging are as described as the contents of simulation as described above.

Hereinabove, there has been described the process for providing the single extant input image point (Ps1) at the position of the prescribed extant input image spatial coordinates (xs1, ys1, zs1) with respect to an input side of the optical system (Ot) and calculating the measured phase distribution Ψs1(u, v) belonging to the extant input image point (Ps1) on the phase defining plane (T). If this process is applied to each of extant input image points (Ps1, Ps2, ... Psj, ... ) located at the prescribed extant input image spatial coordinates (xs1, ys1, zs1), (xs2, ys2, zs2), ..., (xsj, ysj, zsj), and ..., the measured phase distributions Ψs1(u, v), Ψs2(u, v), ..., Ψsj(u, v), and ... belonging to each of the extant input image points (Ps1, Ps2, Psj, ... ) can be obtained.

As described above, the measured phase distributions Ψs1(u, v), Ψs2(u, v), Ψsj(u, v), and ... on the phase defining plane are each information having a value at each point on a two-dimensional plane. When the measured phase distributions are handled as they are as two-dimensional arrangements, the amount of held data and the amount of calculation to be processed become very large. Therefore, expanding coefficients when the measured phase distribution is approximated by expanding by coefficients are obtained and held.

Expanding functions μn (u, v) has a value depending on the coordinates (u, v) on the phase defining plane (T). Herein, the subscript n specifies at which position, a target function is located among a sequence of the expanding functions. According to the type of the expanding functions, n=0, 1, 2, ... , or n= ... , −2, −1, 0, 1, 2, ... , for example. A range of a specific value given to an integer of the subscript n is required to be determined by the accuracy of approximation.

However, the subscript n is not necessarily limited to one integer, and a case where the subscript is constituted of a group of integers, such as a case where m=0, 1, 2, ... , and n=0, 1, 2, ... with respect to expanding functions μ mn (u, v), is included, and the subscript is merely written as n as an example.

If a group of expanding coefficients Ajn n=0, 1, 2, ... is previously determined when the measured phase distribution Ψsj(u, v) is expanded by coefficients and approximated, a value of Ψsj(u, v) with respect to arbitrary coordinates (u, v) can be calculated by calculation of the following formula (1):

$$\Psi sj(u, v) = \Sigma n\{Ajn \cdot \mu n(u, v)\}.$$

Here, Σn denotes that a sum with respect to all values of the subscript n in a prescribed range is acquired.

Naturally, as described above, when the subscript n is constituted of a group of integers like the expanding functions μ mn (u, v), the value of Ψsj(u, v) is calculated by the following formula (2):

$$\Psi sj(u, v) = \Sigma m \Sigma n\{Ajmn \cdot \mu mn(u, v)\}.$$

As described above, when the group of the expanding coefficients Ajn n=0, 1, 2, ... belonging to each of the extant input image points (Ps1, Ps2, Psj, ... ) is determined and held, the measured phase distributions Ψs1(u, v), Ψs2(u, v), Ψsj(u, v), and ... are not required to be held as two-dimensional array data.

As a sequence of the expanding coefficients used for expanding by coefficients, any sequence will serve, provided that the phase Ψsj(u, v) can be calculated as in the formula (1) or (2). For example, Fourier series expansion, Maclaurin expansion, or Zernike polynomial expanding can be adopted.

In the above description, it is described such that after the measured phase distributions Ψs1(u, v), Ψs2(u, v), Ψsj(u, v), and ... , which are two-dimensional array data, are acquired with respect to all j, the group of the expanding coefficients Ajn n=0, 1, 2, ... with respect to each j is acquired. In this description, for ease of understating, the process for acquiring the measured phase distribution and the process for acquiring the group of the expanding coefficients have been separately described. In carrying out this invention, acquisition of the group of the expanding coefficients Ajn n=0, 1, 2, ... immediately after acquisition of the measured phase distribution Ψsj (u, v) may be applied to each of the extant input image points (Ps1, Ps2, ... , Psj, ... ), and this method is more advantageous in terms of eliminating a period during which all the measured phase distributions Ψs1(u, v), Ψs2(u, v), ... , Ψsj(u, v), and ... are held simultaneously.

In the above manner, suppose that holding of the group of the expanding coefficients Ajn n=0, 1, 2, ... belonging to each of the extant input image points (Ps1, Ps2, ... , Psj, ... ) has been completed, there will be described a procedure for determining a value of a phase Ψ(u, v) of a light electric field at arbitrary coordinates (u, v) on the phase defining plane (T) when a virtual illumination light flux emitted from a virtual light emitting point located at arbitrary coordinates (x, y, z) in a virtual input image spatial coordinate system (x, y, z), such as a point of the above-described virtual input pattern, enters the optical system (Ot).

For the sake of ease, it is supposed that the extant input image points (Ps1, Ps2, ... Psj, ... ) are arranged on an xy plane.

Figure 2A:
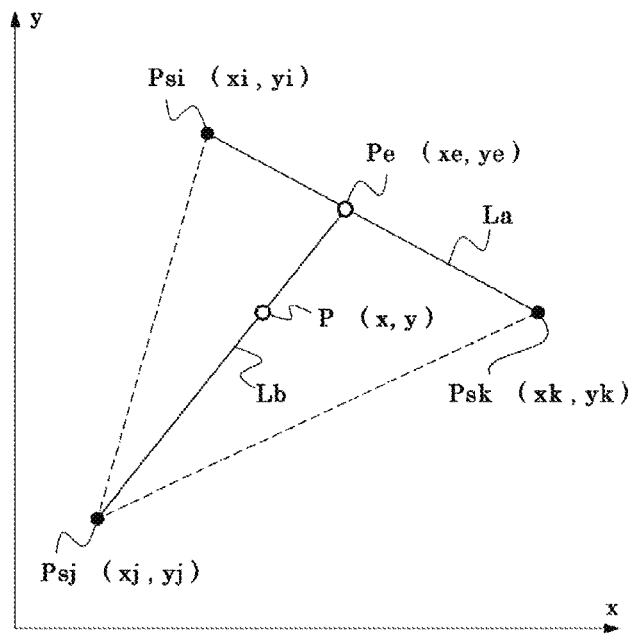
FIGS. 2a and 2b are schematic diagrams of a concept associated with the technique of the optical system phase acquisition method of this invention.

As shown in FIG. 2a which is a schematic diagram of a concept associated with the technique of the optical system phase acquisition method of this invention, it is supposed that among the extant input image points (Ps1, Ps2, . . . ), three closest extant input image points (Ps1, Psj, Psk) surrounding a virtual light emitting point located at the coordinates (x, y, z) are determined.

Needless to say, groups of expanding coefficients Ain, Ajn, Akn n=0, 1, 2, . . . belong to the respective points.

Figure 2B:
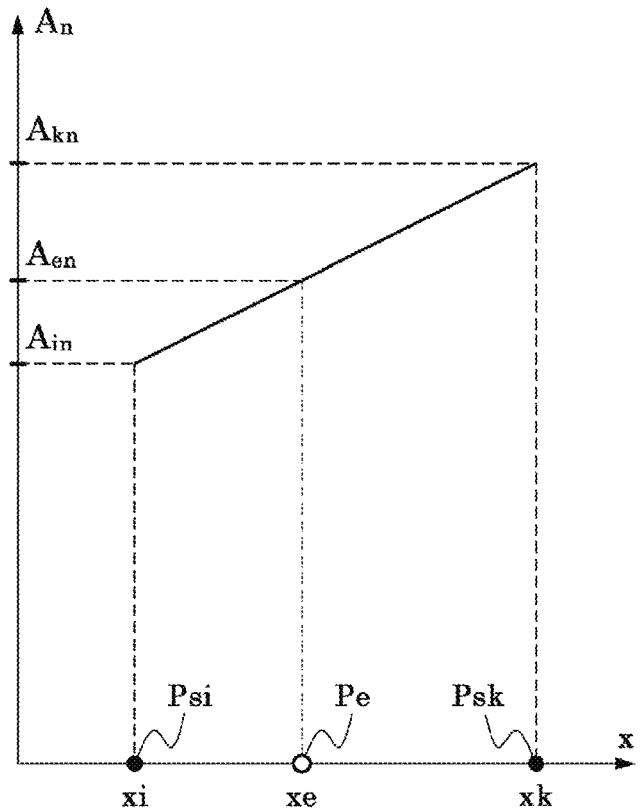

Coordinates (xe, ye) of an intersection point (Pe) of a straight line (La), connecting the extant input image point (Psi) at coordinates (xsi, ysi) and the extant input image point (Psk) at coordinates (xsk, ysk), and a straight line (Lb) connecting the extant input image point (Psj) at coordinates (xsj, ysj) and the virtual light emitting point located at the coordinates (x, y) is easily calculated when the following formula (3), having xe and ye as a variable of an equation and representing the straight light (La):

$$(ye-y)\cdot(xj-x)=(xe-x)\cdot(yj-y), \text{ and}$$

the following formula (4) representing the straight light (Lb):

$(ye-yk)\cdot(xi-xk)=(xe-xk)\cdot(yi-yk)$ are regarded as simultaneous linear equation with two unknowns. Therefore, paying an attention to a ratio of a distance between the extant input image point (Psi) and the extant input image point (Psk) and a distance between the extant input image point (Psi) and the intersection point (Pe), as easily understood from FIG. 2b, a value of expanding coefficients at the intersection point (Pe) is obtained as the following formula (5):

$$Aen=\mu e \cdot (Akn-Ain)+Ain \; n=0, 1, 2, \ldots$$

$\mu e=(xe-xi)/(xk-xi)$ or $(ye-yi)/(yk-yi)$
by interpolation calculation in which a difference Akn-Ain is proportionally distributed. By using this, a value of expanding coefficients at a virtual light emitting point is obtained as the following formula (6):

$$An=\mu \cdot (Aen-Ajn)+Ajn \; n=0, 1, 2, \ldots$$

$\mu=(x-xj)/(xe-xj)$ or $(y-yj)/(ye-yj)$
by similar interpolation calculation paying an attention to a ratio of a distance between the extant input image point (Psj) and the intersection point (Pe) and a distance between the extant input image point (Psj) and the virtual light emitting point. Incidentally, of the coefficients μe and μ, the coefficient in which the denominator is not 0 may be taken.

Generally speaking, FIG. 2a illustrates the case where the x and y coordinates of the extant input image points (Ps1, Psj, Psk) are all different. However, when the extant input image points (Ps1, Ps2, . . . ) are arranged in a lattice form such that the longitudinal and horizontal directions are set equal, calculation becomes easier because, for example, the x coordinate of the extant input image point (Psi) is equal to the x coordinate of the extant input image point (Psj) and the y coordinate of the extant input image point (Psi) is equal to the y coordinate of the extant input image point (Psk).

In this embodiment, although it is assumed that the extant input image points (Ps1, Ps2, . . . ) are arranged on the xy plane, a similar calculation can be performed also when they are arranged three-dimensionally.

Since the group of interpolation expanding coefficients An belonging to a virtual light emitting point located at arbitrary coordinates (x, y, z) in the virtual input image spatial coordinate system (x, y, z) can be thus calculated, the value of the phase $\Psi(u, v)$ of the light electric field at arbitrary coordinates (u, v) on the phase defining plane (T) can be determined by applying a value of specific coordinates (u, v) to the following formula (7) corresponding to the formula (1) and using a sum with coefficients $\Sigma n\{An\cdot\mu n(u, v)\}$ of the expanding functions μn(u, v):

$$\Psi(u, v)=\Sigma n\{An\cdot\mu n(u, v)\} \; n=0, 1, 2, \ldots$$

The phase distribution $\Psi(u, v)$ can be obtained by calculating the value in the formula (7) with respect to a plurality of the coordinates (u, v) distributed at a desired density.

In the optical system phase acquisition method described above, since information belonging to a virtual light emitting point located at the coordinates (x, y, z) not included in a set of the extant input image points (Ps1, Ps2, . . . ) is acquired only by interpolation calculation, in order to prevent the phase $\Psi(u, v)$ to be obtained from being incorrect, a large number of the extant input image points (Ps1, Ps2, . . . ) are required to be arranged. However, it is advantageously possible to acquire the phase $\Psi(u, v)$ even if information on an internal structure of the optical system (Ot) as a target is unknown.

In the optical system phase acquisition method according to the second invention to be described next, although interpolation calculation is used as in the method according to the first invention, premising that design data of the optical system (Ot) is known, ray tracing simulation is performed, and the phase $\Psi(u, v)$ is acquired by incorporating the simulation result into information of measured phase distributions $\Psi s1(u, v)$, $\Psi s2(u, v)$, . . . . Since this method does not depend on only interpolation calculation, this method has an advantage that the number of the extant input image points (Ps1, Ps2, . . . ) can be reduced as compared with the above-described method.

The ray tracing simulation to be performed as an initial process of the second invention will be described.

First, a plurality of rays emitted from the input image point (Pt) corresponding to the extant input image point (Ps1) are set. As a preferable method of setting the rays, for example, an entrance pupil plane of the optical system (Ot) is divided into cells with suitable sizes, and the rays are set to be a skew ray group emitted from the input image point (Pt1) and passing through the center of each cell.

Although the details of a ray tracing simulation method are not described in this specification, in a traveling path in a ray propagation space, when a refractive index is uniform, the travelling path is obtained as mere straight traveling of rays, and when the refractive index is not uniform, the travelling path is obtained by, for example, a Runge-Kutta method. When a ray encounters a refractive surface, a direction of the ray having been refracted can be determined and traced by Snell's law, based on an angle formed by a normal line of the refractive surface and the ray. When the ray encounters a reflective surface, the refractive index of the space is made negative until the ray further encounters a reflective surface, and the direction of the ray can be traced by the same calculation as that used for a refraction medium described above.

With respect to all rays included in the ray group, an optical path length $\Gamma 1(u, v)$ from the input image point (Pt1) to the phase defining plane (T) is calculated by the ray tracing simulation based on design data of the optical system (Ot), and, at the same time, the coordinates (u, v) at an intersection point of the phase defining plane (T) is acquired. In addition, the optical path length $\Gamma 1(u, v)$ is multiplied by a wavenumber, whereby traced phase distribution $\Psi t1(u, v)$ belonging to the extant input image point (Ps1) on the phase defining plane (T) can be acquired.

When the above process applied to the extant input image point (Ps1) is applied to each of the extant input image points (Ps1, Ps2, . . . , Psj, . . . ) located at the prescribed extant input image spatial coordinates (xs1, ys1, zs1), (xs2, ys2, zs2), . . . , (xsj, ysj, zsj), and . . . , the traced phase distributions Ψt1(u, v), Ψ2(u, v), . . . , Ψtj(u, v), and . . . belonging to each of the extant input image points (Ps1, Ps2, . . . , Psj, . . . ) can be obtained.

In the same manner as the case where the measured phase distributions Ψs1(u, v), Ψs2(u, v), . . . , Ψsj(u, v), and . . . are first expanded by the expanding functions μn(u, v) and replaced with the group of the expanding coefficients Ajn n=0, 1, 2, . . . , the traced phase distributions Ψt1(u, v), Ψt2(u, v), . . . , Ψtj(u, v), and . . . are expanded by the expanding functions μn(u, v) and replaced with a group of the expanding coefficients Bjn n=0, 1, 2, . . . .

In such a case, the process for acquiring the traced phase distribution Ψtj(u, v) and then immediately acquiring the group of the expanding coefficients Bjn n=0, 1, 2, . . . may be similarly applied to each of the input image points (Pt1, Pt2, . . . , Ptj, . . . ).

In addition, even if there are a plurality of actual optical systems (Ot) produced based on the same design data, the initial process of the second invention as described above is executed only once, and the group of the expanding coefficients Bjn n=0, 1, 2, . . . may be held as data.

The group of the expanding coefficients Bjn n=0, 1, 2, . . . which is common stored data may be applied to each of the actual optical systems (Ot).

As the second process of the second invention, in the actual optical system (Ot), there is executed the process described in the first invention for providing the extant input image points (Ps1, Ps2, Psj, . . . ) at the positions of the prescribed extant input image spatial coordinates (xs1, ys1, zs1), (xs2, ys2, zs2), . . . , (xsj, ysj, zsj), and . . . with respect to the input side of the optical system (Ot) to acquire the interference image data (Df) with respect to each of the extant input image points, acquiring the measured phase distributions Ψs1(u, v), Ψs2(u, v), Ψsj(u, v), and . . . belonging to the extant input image points (Ps1, Ps2, . . . , Psj, . . . ), and determining and holding the group of the expanding coefficients Ajn n=0, 1, 2, . . . belonging to each of the extant input image points (Ps1, Ps2, Psj, . . . ).

Next, the groups of the expanding coefficients An and Bjn belonging to each of the extant input image points (Ps1, Ps2, . . . , Psj, . . . ) are replaced with a group of expanding coefficients Δjn by the following formula (8):

$$\Delta jn = Ajn - Bjn.$$

When this is held, thereafter, a difference between the measured phase and the traced phase belonging to the extant input image point (Psj) at arbitrary coordinates (u, v) on the phase defining plane (T) can be calculated by the following formula (9):

$$\Psi sj(u, v) - \Psi tj(u, v) = \Sigma n \{\Delta jn \cdot \mu n(u, v)\}.$$

In the above manner, suppose that holding of the group of the expanding coefficients Δjn n=0, 1, 2, . . . belonging to each of the extant input image points (Ps1, Ps2, . . . , Psj, . . . ) has been completed, there will be described a procedure for determining a value of a phase Ψ(u, v) of a light electric field at arbitrary coordinates (u, v) on the phase defining plane (T) when a virtual illumination light flux emitted from a virtual light emitting point located at arbitrary coordinates (x, y, z) in a virtual input image spatial coordinate system (x, y, z), such as a point of the above-described virtual input pattern, enters the optical system (Ot).

When the coordinates (x, y, z) of the virtual light emitting point has been determined, first, as in the process for determining the value of the interpolation expanding coefficient An by the formula (6) with the use of interpolation calculation according to, among the extant input image points (Ps1, Ps2, . . . ) described above, each coordinate of three closest extant input image points (Ps1, Psj, Psk) surrounding a virtual light emitting point located at the coordinates (x, y, z) and the groups of the expanding coefficients Ain, Ajn, Akn n=0, 1, 2, . . . belonging to the respective points, a group of interpolation expanding coefficients Δn n=0, 1, 2, . . . is previously determined using interpolation calculation according to, according to, among the extant input image points (Ps1, Ps2, . . . ), each coordinate of the three closest extant input image points (Ps1, Psj, Psk) surrounding the virtual light emitting point located at the coordinates (x, y, z) and groups of the expanding coefficients Δin, Δjn, Δkn n=0, 1, 2, . . . belonging to the respective points.

The ray tracing simulation based on design data of the optical system (Ot) similar to the above-described ray tracing simulation applied to the rays emitted from the input image points (Pt1, Pt2, . . . , Ptj, . . . ) is applied to rays emitted from the virtual light emitting point located at the coordinates (x, y, z).

In the above-described ray tracing simulation based on the design data of the optical system (Ot) applied to the rays emitted from the input image points (Pt1, Pt2, . . . , Ptj, . . . ), as a method of setting rays to be traced, there has been described the case where the entrance pupil plane of the optical system (Ot) is divided into cells with suitable sizes, and the rays are set to be a skew ray group emitted from the input image points (Pt1, Pt2, . . . , Ptj, . . . ) and passing through the center of each cell. However, hereinafter, in view of the purpose of determining the value of the phase Ψ(u, v) of the light electric field at the coordinates (u, v) on the phase defining plane (T), suppose that rays (ray group) to be used is already determined, the ray tracing simulation applied to one of the rays will be described.

Although a method of determining a three-dimensional direction of a skew ray which is to be traced and is emitted from a virtual light emitting point located at the coordinates (x, y, z) is optional, similarly to the above, since a method of specifying entrance pupil plane coordinates (u', v') toward which the ray travels to determine the three-dimensional direction of the ray is preferable, the direction of the skew ray is determined by this method in the following description.

When the direction of the skew ray to be traced has been determined, first, an optical path length Γ(u, v) from a virtual light emitting point located at the coordinates (x, y, z) to the phase defining plane (T) is calculated by the ray tracing simulation based on the design data of the optical system (Ot) and, at the same time, the coordinates (u, v) at an intersection point of the phase defining plane (T) is acquired. In addition, the optical path length Γ(u, v) is multiplied by a wavenumber, whereby an ideal phase Ψ'(u, v) belonging to the virtual light emitting point on the phase defining plane (T) is acquired.

The acquired coordinates (u, v) is applied to the following formula (10):

$$\delta\Psi(u, v) = \Sigma n \{\Delta n \cdot \mu N(u, v)\} \; n=0, 1, 2,$$

whereby the phase difference δΨ(u, v) which is a difference between the measured phase and the traced phase is calculated. The value of the phase Ψ(u, v) can be determined by the following formula (11):

$$\Psi(u, v) = \Psi'(u, v) + \delta\Psi(u, v),$$

where the phase difference δΨ(u, v) is added to the previously acquired ideal phase Ψ'(u, v).

When a value of the phase Ψ(u, v) is determined with respect to another ray emitted from a virtual light emitting point located at the same coordinates (x, y, z), processes from the process for specifying the entrance pupil plane coordinates (u', v') toward which the ray travels to the process for determining the value of the phase Ψ(u, v) by the formula (11) may be executed. Thus, the phase distribution Ψ(u, v) can be obtained by calculating the value in the formula (11) with respect to a plurality of the entrance pupil plane coordinates (u', v') distributed at a desired density.

In the above description, although procedures and the like executed when the measured phase distributions Ψs1(u, v), Ψs2(u, v), and . . . belonging to each of the extant input image points (Ps1, Ps2, . . . ) are not described in detail, at its simplest, there may be performed a method of dividing for each of the extant input image points (Ps 1, Ps2, . . . ) to acquire the interference image data (Df), that is, a method of performing such sequential operation that the extant input image point (Ps1) is generated alone to image an interference image and thus to acquire the interface image data (Df), whereby the measured phase distribution Ψs1(u, v) is acquired, and the extant input image point (Ps2) is generated alone to image an interference image and thus to acquire the interface image data (Df), whereby the measured phase distribution Ψs2(u, v) is acquired.

More specifically, a mask plate having a pin hole therethrough or fitted with a convex or concave lens is prepared, installed on an XY stage, which can be controlled by a signal from the processing apparatus (Up), for example, to be allowed to be movable, and configured such that a light flux from the primary coherence light source is applied to the mask plate, whereby the above sequential operation can be achieved.

Although this method has an advantage that each of the measured phase distributions Ψs1(u, v), Ψs2(u, v), and . . . which are information items desired to be obtained can be acquired directly, since the measured phase distributions are acquired while the mask plate is moved mechanically, it takes time, and, in addition, the XY stage is required. Thus, there is the weak point that the configuration becomes on a large-scale.

As a method of improving this weak point, there is a method of acquiring the interference image data (Df) collectively including information of interference images about all the extant input image points (Ps1, Ps2, and . . . ).

In this case, separation into each of the measured phase distributions Ψs1(u, v), Ψs2(u, v), and . . . is required to be performed by calculation.

More specifically, a mask plate used for generating all the necessary extant input image points (Ps1, Ps2, and . . . ) and having pin holes therethrough or a lens array in which lenses are arrayed two-dimensionally is prepared, and the light flux from the primary coherence light source is applied thereto to image an interference image, whereby the interference image data (Df) collectively including information of interference images about all the extant input image points (Ps1, Ps2, and . . . ) is obtained.

In order to separate this into each of the measured phase distributions Ψs1(u, v), Ψs2(u, v), and . . . , a process for calculating the measured phase distributions Ψs1(u, v), Ψs2(u, v), and . . . on the phase defining plane (T) by the diffractive optical light propagation simulation in which light is propagated in the direction opposite to an original light traveling direction from the imaging surface (Sf) to the phase defining plane (T) is performed divided into two stages, including a first stage and a second stage. This process will be described with reference to FIG. 3 which is a schematic diagram of a concept associated with the technique of the optical system phase acquisition method of this invention.

Figure 3:
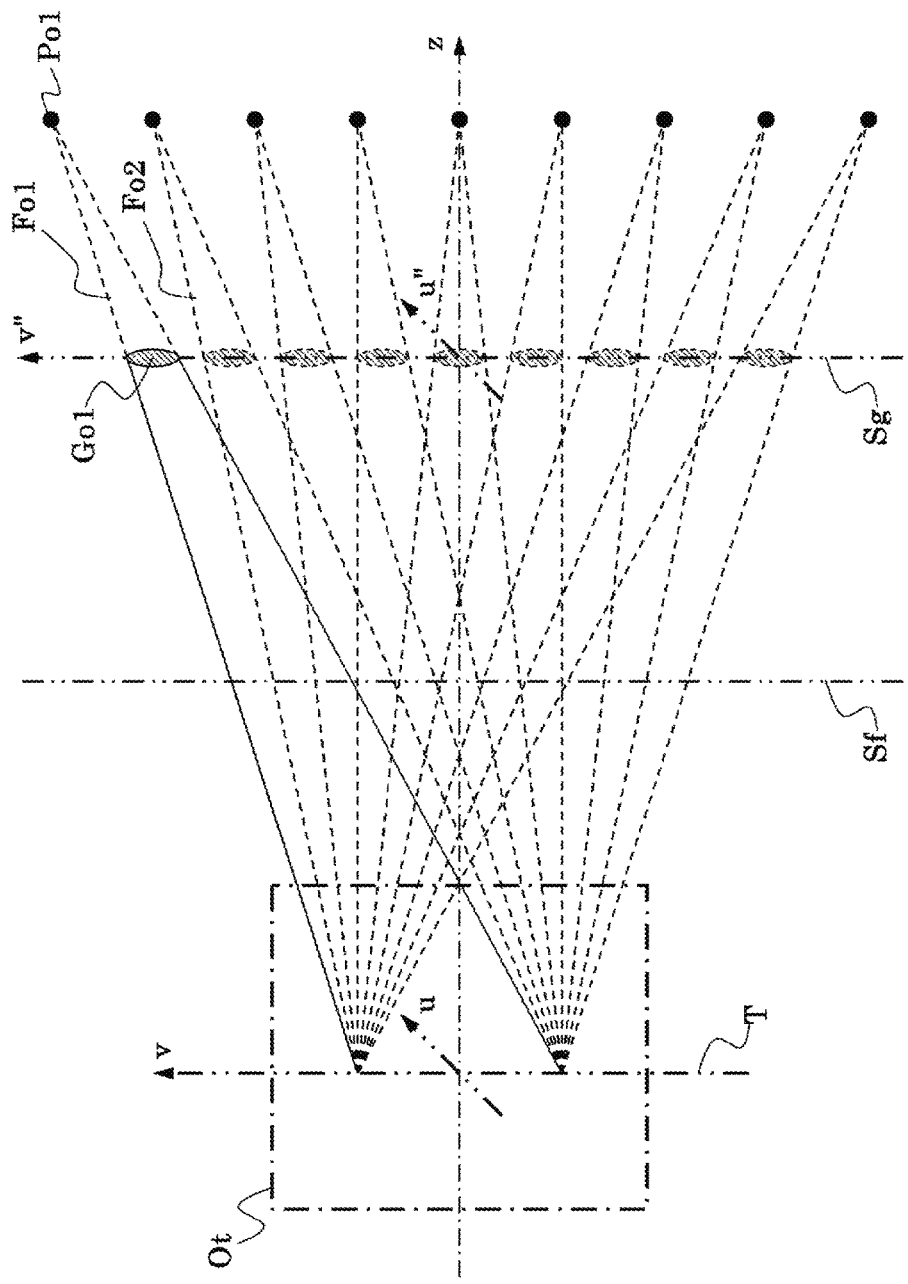
FIG. 3 is a schematic diagram of a concept associated with the technique of the optical system phase acquisition method of this invention.

When the optical system (Ot) as shown above in FIG. 1 forms a real image as an output image with respect to the extant input image points (Ps1, Ps2, and . . . ), at a position traveled in the light traveling direction, light is not propagated in the direction opposite to an original light traveling direction, and as shown in FIG. 3, if diffractive optical light propagation simulation in which light is propagated in the light traveling direction by a satisfactory distance is performed, reconstructed extant output light fluxes (Fo1, Fo2, and . . . ) should be separated. On the other hand, when the optical system (Ot) forms a virtual image as an output image, if diffractive optical light propagation simulation in which light is propagated in a direction opposite to the light traveling direction by a satisfactory distance is performed, reconstructed extant output light fluxes (Fo1, Fo2, and . . . ) should be separated.

Thus, first, in the first stage, there is performed diffractive optical light propagation simulation in which light is propagated to a separation reconstruction surface (Sg) which is a plane which is away from the imaging surface (Sf) by a distance required for separation in a direction in which the extant output light fluxes (Fo1, Fo2, and . . . ) to be reconstructed separate and is vertical to an optical axis, and a phase distribution Ψg1(u", v") of the light electric field in a light flux cross-section portion (Go1) on the separation reconstruction surface (Sg) of the reconstructed extant output light flux (Fo1) is calculated and acquired.

In the second stage, diffractive optical light propagation simulation in which light of the phase distribution Ψg1(u", v") on the separation reconstruction surface (Sg) is propagated to the phase defining plane (T) is performed, and the measured phase distribution Ψs1(u, v) is calculated.

Then, when the process comprising the two stages including the first and second stages is applied to each of the reconstructed extant output light fluxes (Fo1, Fo2, and . . . ), the measured phase distributions Ψs1(u, v), Ψs2(u, v), and . . . can be separated and calculated.

When the imaging surface (Sf) and the phase defining plane (T) coincide with each other, in the second stage, diffractive optical light propagation simulation in which light is returned to the imaging surface (Sf) as the phase defining plane (T) is performed.

Here, a specific configuration for achieving acquisition of the interference image data (Df) collectively including information of interference images about all the extant input image points (Ps1, Ps2, and . . . ), as described above will be described with reference to FIG. 4 which is a schematic diagram of the configuration associated with the technique of the optical system phase acquisition method of this invention.

A light source beam (As) from a primary coherence light source (Us) such as a helium-neon laser is divided into a beam (Ai) for generating an illumination light flux and a beam (Ar) for generating a reference light flux by a beam splitter (BS1) for beam division.

A reference light flux generating unit is constituted of a mirror (Mr) and a beam expander (BEr). The beam (Ar) for generating a reference light flux is reflected by the mirror (Mr) and then input to the beam expander (BEr) constituted of a condenser lens (Lrf) and a collimator lens (Lrc), and a reference light flux (Fr) is generated as a parallel light flux in which a beam is enlarged to have a necessary thickness.

If a pin hole opening (Ua) is installed so as to coincide with a light-collecting point of the condenser lens (Lrf), the beam expander (BEr) can provide a function of a spatial frequency filter which removes components other than a spatial DC component, whereby optical noise caused by dust and the like adhered to a surface of an optical element present in an optical path extending to the pin hole opening (Ua) is removed, so that the reference light flux (Fr) can be cleaned up.

On the other hand, an illumination light flux generating unit is constituted of a mirror (Mi) and a beam expander (BEi). The beam (Ai) for generating an illumination light flux is reflected by the mirror (Mi) and then input to the beam expander (BEi) constituted of a condenser lens (Lie and a collimator lens (Lic), and a primary illumination light flux (Fi) is generated as a parallel light flux in which a beam is enlarged to have a necessary thickness.

A pin hole opening similar to the pin hole opening (Ua) may be installed with respect to the beam expander (BEi), but it is omitted in this drawing.

The illumination light flux generating unit further includes a lens array (Lm) and a mask plate (Pm) and, if necessary, includes a light flux conversion optical system (Oc).

The primary illumination light flux (Fi) enters the lens array (Lm) and forms light-collecting regions at a focusing portion of each lens of the lens array (Lm).

Pin holes are opened in the mask plate (Pm), and the lens array (Lm) and the mask plate (Pm) are combined such that a region centering on each of the pin holes is illuminated by the light-collecting region formed by the lens array (Lm).

The pin holes of the mask plate (Pm) each form an input image point set, and since light fluxes from them are telecentric, the light flux conversion optical system (Oc) is provided if necessary. Matching is performed such that each main ray travels toward an entrance pupil of the optical system (Ot) as a target of acquisition of a phase, and the rays as illumination light fluxes (Fs1, Fs2, and . . . ) of each of them collectively enter the optical system (Ot).

Accordingly, virtual images formed by forming an image of each of the pin holes of the mask plate (Pm) by the light flux conversion optical system (Oc) become the extant input image points (Ps1, Ps2, and . . . ).

The extant output light fluxes (Fo1, Fo2, and . . . ) generated by the optical system (Ot) by receiving the illumination light fluxes (Fs1, Fs2, and . . . ) are reflected by a beam splitter (BS2) and applied to the imaging surface (Sf) of the imaging element (Uf).

Here, it is assumed that an angle of the beam splitter (BS2) is adjusted such that the optical axis of the optical system (Ot) is vertical to the imaging surface (Sf).

The reference light flux (Fr) is transmitted through the beam splitter (BS2) and similarly applied to an imaging surface of the imaging element (Uf) while being superimposed with the extant output light fluxes (Fo1, Fo2, and . . . ), and an interference image is formed on the imaging surface of the imaging element (Uf) and imaged. Thus, the interference image data (Df) collectively including information of interference images about all the extant input image points (Ps1, Ps2, and . . . ) can be acquired.

However, in this drawing, it is assumed that there is provided a so-called off-axis type in which an optical axis of the reference light flux (Fr) is set to incline with respect to the imaging surface of the imaging element (Uf) without being vertical thereto so as not to be coaxial with the optical axes of the extant output light fluxes (Fo1, Fo2, and . . . ).

Corresponding to the fact that +1st, 0th, and −1st order diffraction light are generated from a sinusoidal concentration diffraction grating, in holography (including digital holographic imaging), also in a reconstructed image, three kinds of normal images including a +1st-order image, a 0th-order image (transmitted light), and −1st-order image (conjugate image) are generated.

When the off-axis type is not provided (in a case of an inline type), light fluxes forming those three kinds of images are all output in the same direction, so that cumbersome noise is superimposed with the normal images.

The objective of providing the off-axis type is to thereby separate the directions of the light fluxes forming those three kinds of images and avoid the problem that cumbersome noise is superimposed with the normal images.

However, if the off-axis type is adopted, since an interference fringe of an interference image becomes thin, as the imaging element (Uf), an imaging element in which the pixel size is fine and the number of pixels is large is required to be used, and thus the off-axis type has such a drawback that the load of the computing process increases.

In order to avoid this problem, it is necessary to adopt the inline type and then avoid the problem that cumbersome noise is superimposed with the normal images. In this respect, many kinds of proposals have been tried.

For example, there is a method of imaging the interference images in which the phase of the reference light flux (Fr) is shifted and reconstructing an image by calculation using the data thereof. (Reference: OPTICS LETTERS, Vol. 22, No. 16, Aug. 15, 1997, pp 1268-1270, Yamaguchi I. et al: "Phase-shifting digital holography")

Also in the present optical system phase acquisition method, the above method can be applied, and in order to shift the phase of the reference light flux (Fr), the mirror (Mr) is modified such that the mirror (Mr) is movable by using a fine-movement mechanism according to a piezo element and so on, for example, whereby the above method can be applied.

Although the size of the optical system (Ot) as a target of acquisition of a phase, that is, the thickness of a cross section vertical to an optical axis of each of the extant output light fluxes (Fo1, Fo2, and . . . ) or a space occupied by the entirety of the extant output light fluxes (Fo1, Fo2, and . . . ) differs from one to another, the dimension of the imaging surface (Sf) of the imaging element (Uf) which is available is limited.

Accordingly, in some cases, the dimension of the imaging surface (Sf) may be insufficient with respect to a necessary size, and particularly when the interference image data (Df) collectively including information of interference images about all the extant input image points (Ps1, Ps2, and . . . ) is acquired, such a circumstance is likely to occur.

Avoidance of this problem will be described with reference to FIG. 5 which is a schematic diagram of the configuration associated with the technique of the optical system phase acquisition method of this invention.

Figure 4:
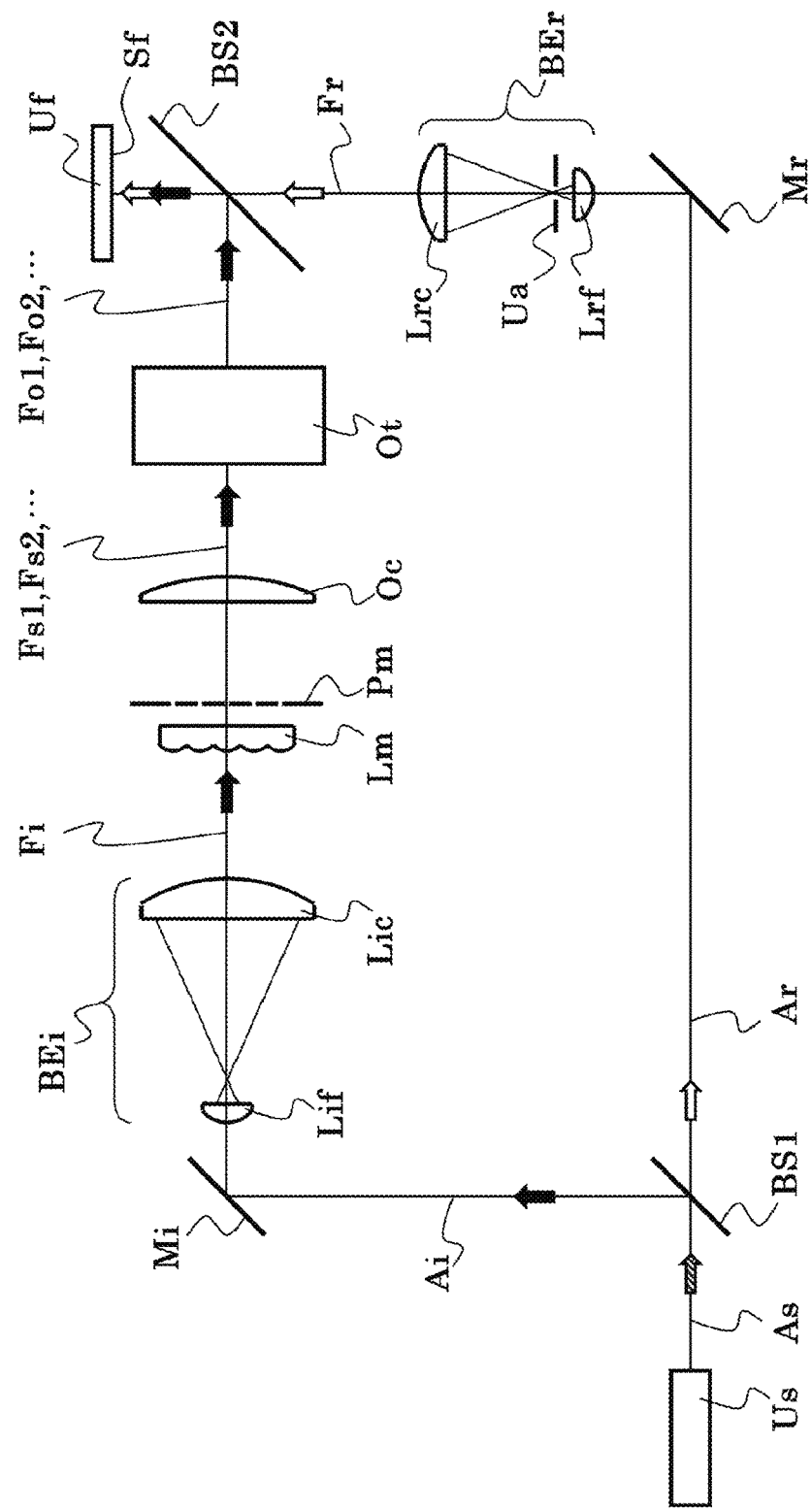
FIG. 4 is a schematic diagram of the configuration associated with the technique of the optical system phase acquisition method of this invention.

In the configuration of this drawing, with respect to the configuration described in FIG. 4, a relay optical system (Oq) exhibiting an action of reducing the thickness of a light flux group constituted of the entirety of the illumination light fluxes (Fs1, Fs2, and . . . ) is inserted in the post stage of the optical system (Ot), that is, between the optical system (Ot) and the imaging element (Uf).

The extant output light fluxes (Fo1, Fo2, and . . . ) generated by the optical system (Ot) by receiving the illumination light fluxes (Fs1, Fs2, and . . . ) enter the relay optical system (Oq) disposed coaxially with the optical axis of the optical system (Ot), and relay output light fluxes (Fq1, Fq2, and . . . ) are collectively output from the relay optical system (Oq).

The relay output light fluxes (Fq1, Fq2, and . . . ) are reflected by the beam splitter (BS2) to be applied onto the imaging surface (Sf) of the imaging element (Uf) without exceeding the dimension, and thus to be superimposed with the reference light flux (Fr) transmitted through the beam splitter (BS2), whereby an interference image is imaged.

Since the configuration of the relay optical system (Oq) is required to be determined according to the configuration of the optical system (Ot), how to achieve the configuration of the relay optical system (Oq) cannot be unqualifiedly mentioned; however, usually, it is preferable to design such that a reduced image conjugate to the exit pupil of the optical system (Ot) is formed on the imaging surface (Sf).

However, since the beam splitter (BS2) is required to be present between the relay optical system (Oq) and the imaging surface (Sf), the relay optical system (Oq) should be designed as a retrofocus optical system, and in this case, the relay optical system (Oq) is required to be realized by a combined lens constituted of a plurality of lenses.

There will be described the method of acquiring the measured phase distributions $\Psi s1(u, v)$, $\Psi s2(u, v)$, and . . . , belonging to each of the extant input image points (Ps1, Ps2, . . . ) on the phase defining plane (T) of the optical system (Ot), from the interference image data (Df) acquired through the relay optical system (Oq) and collectively including information of interference images about all the extant input image points (Ps1, Ps2, and . . . ).

Hereinabove, there has been described that, when the measured phase distributions $\Psi s1(u, v)$, $\Psi s2(u, v)$, and . . . belonging to each of the extant input image points (Ps1, Ps2, . . . ) on the phase defining plane (T) of the optical system (Ot) are acquired from the interference image data (Df) acquired not through the relay optical system (Oq) and collectively including information of interference images about all the extant input image points (Ps1, Ps2, and . . . ), there is performed diffractive optical light propagation simulation in which light is propagated to the separation reconstruction surface (Sg) which is a plane which is away from the imaging surface (Sf) by a distance required for separation in the direction in which the extant output light fluxes (Fo1, Fo2, and . . . ) to be reconstructed separate and is vertical to the optical axis, and the phase distribution $\Psi g1(u'', v'')$ of the light electric field in the light flux cross-section portion (Go1) on the separation reconstruction surface (Sg) of the reconstructed extant output light flux (Fo1) is calculated.

Also in the above case where the interference image data (Df) is acquired through the relay optical system (Oq), since a plane vertical to an optical axis at a suitable position where light fluxes to be reconstructed are observed separately, that is, a separation reconstruction surface exists, paying an attention to a certain light flux (set to be a j-th light flux), if phase distribution of the light flux on the separation reconstruction surface is calculated, a direction of a ray at an arbitrary point on the separation reconstruction surface can be determined.

Accordingly, ray tracing simulation in which light travels in a direction opposite to an original light traveling direction is performed based on design data of the relay optical system (Oq) until the light travels from the separation reconstruction surface in an output image space of the relay optical system (Oq) to the phase defining plane (T) of the optical system (Ot) in an input image space of the relay optical system (Oq), whereby the coordinates (u, v) at an arrival point on the phase defining plane (T) can be determined, and, at the same time, the measured phase distribution $\Psi sj(u, v)$ at an arrival point on the phase defining plane (T) can be determined by subtracting a phase, obtained by multiplying an optical path length from the separation reconstruction surface to the phase defining plane (T) by a wavenumber, from a phase on the separation reconstruction surface. Thus, the phase distribution on the phase defining plane (T) can be acquired.

The measured phase distributions $\Psi s1(u, v)$, $\Psi s2(u, v)$, $\Psi sj(u, v)$, and . . . can be acquired by applying this operation to all light fluxes observed separately by reconstruction.

As is easily seen from the description above, since the ray tracing simulation is performed back through light propagation in the relay optical system (Oq), the relay optical system (Oq) may have aberration as designed.

However, if a lens included in the relay optical system (Oq) has defects such as an error in a curvature radius of a refractive surface and surface sag, or if there are eccentricity and an error in a distance between lenses, since an error occurs in phase distribution to be acquired, careful processing is required.

Figure 5:
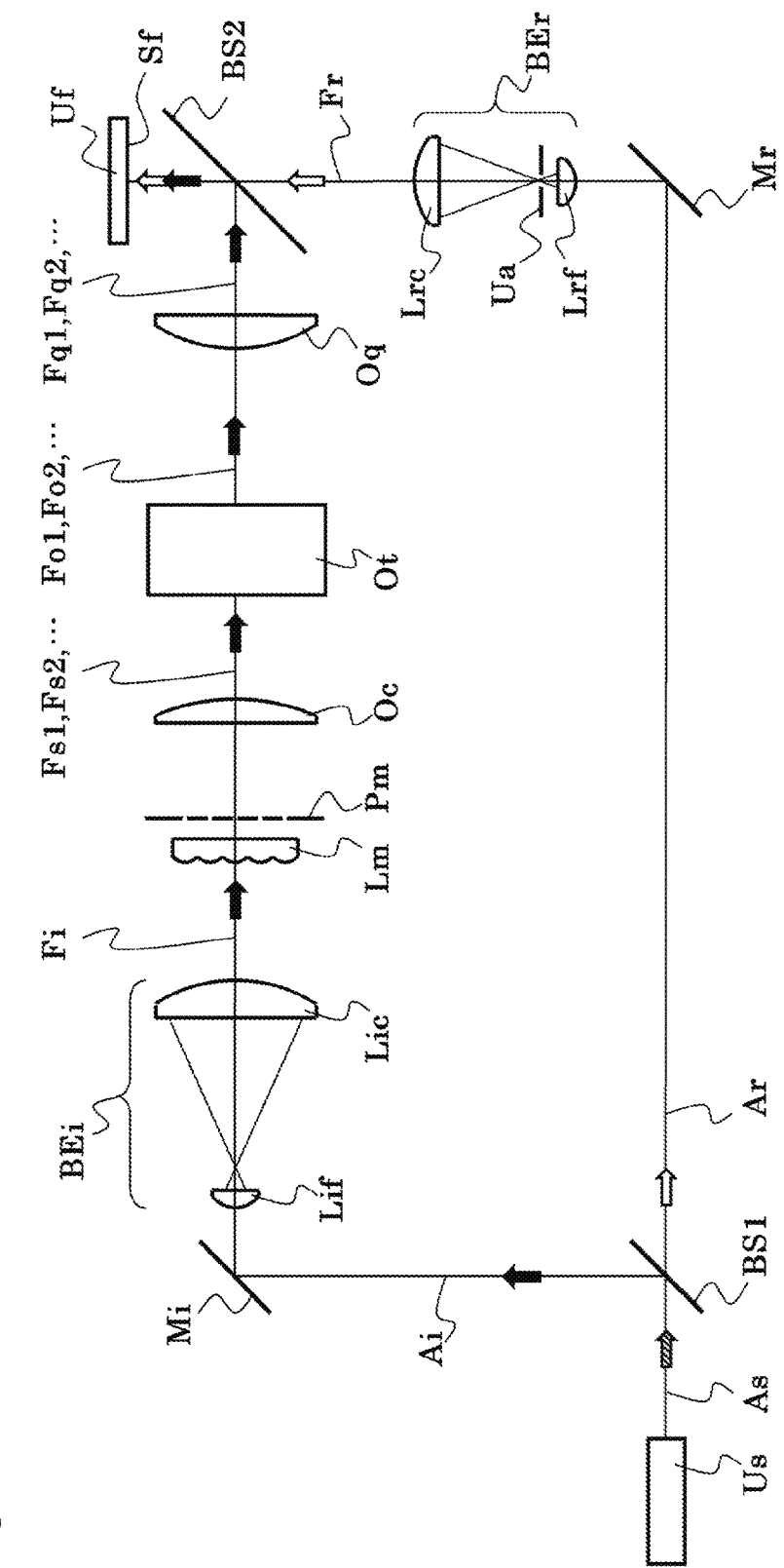
FIG. 5 is a schematic diagram of the configuration associated with the technique of the optical system phase acquisition method of this invention.

In the configuration of FIG. 5, the extant input image points (Ps1, Ps2, and . . . ) are collectively generated, and thus since the interference image data (Df) includes information on all the relay output light fluxes (Fq1, Fq2, and . . . ), the operation of separating light fluxes is performed. However, when the interference image data (Df) is acquired by dividing for each of the extant input image points (Ps1, Ps2, . . . ), since only information of light emitted from a point is included in phase distribution on the imaging surface (Sf), a direction of a ray at an arbitrary point can be determined from the phase distribution, and accordingly, backward ray tracing simulation from this surface to the phase defining plane (T) of the optical system (Ot) may be performed.

It is particularly preferable that the above-described expanding by coefficients is Zernike polynomial expanding (reference: M. Born, E. Wolf (translated by Toru KUSAKAWA and Hideshi YOKOTA): Principles of Optics II, published by the Tokai University, Dec. 20, 1980, fourth issue, 9.2.1, Appendix VII).

Zernike polynomials are defined inside a unit circle, that is, a circle whose radius is 1, and when coordinates $(\alpha, \beta)$ there is represented by polar coordinates $(\rho, \theta)$ connected by the following formula (12):

$$\alpha = \rho \cos \theta$$

$$\beta = \rho \sin \theta,$$

a phase $\Psi(\rho, \theta)$ is represented by a sum of values obtained by multiplying a Zernike polynomial $Znm(\rho, \theta)$ which is the expanding coefficient by a Zernike expanding coefficient Anm which is the expanding coefficient, as shown in FIG. 7a which is a schematic diagram of a concept associated with the technique of the optical system phase acquisition method of this invention, when the Zernike polynomials are used.

The Zernike polynomial $Znm(\rho, \theta)$ is represented by a product of a radial function $Rnm(\rho)$ and an argument function $fm(\theta)$, as shown in FIG. 7b. Here, the radial function $Rnm(\rho)$ is determined by the method shown in FIG. 7c, and the argument function $fm(\theta)$ is as shown in FIG. 7d.

However, as described in FIG. 7a, a main order n handles numbers from 0 to a suitably determined upper limit N, and only auxiliary orders m whose difference from the main order n is even are handled.

In the calculation shown in FIG. 7c, in some cases, a value of (n+m)/2−s becomes a negative integer. Although the factorial of the value cannot be calculated, when a reciprocal form of J!=J·(J−1)! as a generally exhibited property associated with the factorial, 1/(J−1)!=J/J! is applied to a sequence J=0, −1, −2, . . . , since it can be interpreted in an extended manner that the reciprocal of the factorial of a negative integer is 0, a coefficient of the power term of ρ with respect to s in a condition where the value of (n+m)/2−s becomes negative is set to be 0.

A specific form of the Zernike polynomial Znm(ρ, θ) in a range n=0, 1, . . . , 10 of the main order n is as represented by the following formula (13).

| k | n | m | Z nm(ρ, θ) |
|---|---|---|---|
| 1 | 0 | 0 | +1 |
| 2 | 1 | 1 | +ρ · cosθ |
| 3 | 1 | −1 | +ρ · sinθ |
| 4 | 2 | 2 | +ρ^2 · cos2θ |
| 5 | 2 | 0 | +2ρ^2 −1 |
| 6 | 2 | −2 | +ρ^2 · sin2θ |
| 7 | 3 | 3 | +ρ^3 · cos3θ |
| 8 | 3 | 1 | {+3ρ^3 −2ρ} cosθ |
| 9 | 3 | −1 | {+3ρ^3 −2ρ} sinθ |
| 10 | 3 | −3 | +ρ^3 · sin3θ |
| 11 | 4 | 4 | +ρ^4 · cos4θ |
| 12 | 4 | 2 | {+4ρ^4 −3ρ^2} cos2θ |
| 13 | 4 | 0 | +6ρ^4 −6ρ^2 +1 |
| 14 | 4 | −2 | {+4ρ^4 −3ρ^2} sin2θ |
| 15 | 4 | −4 | +ρ^4 · sin4θ |
| 16 | 5 | 5 | +ρ^5 · cos5θ |
| 17 | 5 | 3 | {+5ρ^5 −4ρ^3} cos3θ |
| 18 | 5 | 1 | {+10ρ^5 −12ρ^3 +3ρ} cosθ |
| 19 | 5 | −1 | {+10ρ^5 −12ρ^3 +3ρ} sinθ |
| 20 | 5 | −3 | {+5ρ^5 −4ρ^3} sin3θ |
| 21 | 5 | −5 | +ρ^5 · sin5θ |
| 22 | 6 | 6 | +ρ^6 · cos6θ |
| 23 | 6 | 4 | {+6ρ^6 −5ρ^4} cos4θ |
| 24 | 6 | 2 | {+15ρ^6 −20ρ^4 +6ρ^2} cos2θ |
| 25 | 6 | 0 | +20ρ^6 −30ρ^4 +12ρ^2 −1 |
| 26 | 6 | −2 | {+15ρ^6 −20ρ^4 +6ρ^2} sin2θ |
| 27 | 6 | −4 | {+6ρ^6 −5ρ^4} sin4θ |
| 28 | 6 | −6 | +ρ^6 · sin6θ |
| 29 | 7 | 7 | +ρ^7 · cos7θ |
| 30 | 7 | 5 | {+7ρ^7 −6ρ^5} cos5θ |
| 31 | 7 | 3 | {+21ρ^7 −30ρ^5 +10ρ^3} cos3θ |
| 32 | 7 | 1 | {+35ρ^7 −60ρ^5 +30ρ^3 −4ρ} cosθ |
| 33 | 7 | −1 | {+35ρ^7 −60ρ^5 +30ρ^3 −4ρ} sinθ |
| 34 | 7 | −3 | {+21ρ^7 −30ρ^5 +10ρ^3} sin3θ |
| 35 | 7 | −5 | {+7ρ^7 −6ρ^5} sin5θ |
| 36 | 7 | −7 | +ρ^7 · sin7θ |
| 37 | 8 | 8 | +ρ^8 · cos8θ |
| 38 | 8 | 6 | {+8ρ^8 −7ρ^6} cos6θ |
| 39 | 8 | 4 | {+28ρ^8 −42ρ^6 +15ρ^4} cos4θ |
| 40 | 8 | 2 | {+56ρ^8 −105ρ^6 +60ρ^4 −10ρ^2} cos2θ |
| 41 | 8 | 0 | +70ρ^8 −140ρ^6 +90ρ^4 −20ρ^2 +1 |
| 42 | 8 | −2 | {+56ρ^8 −105ρ^6 +60ρ^4 −10ρ^2} sin2θ |
| 43 | 8 | −4 | {+28ρ^8 −42ρ^6 +15ρ^4} sin4θ |
| 44 | 8 | −6 | {+8ρ^8 −7ρ^6} sin6θ |
| 45 | 8 | −8 | +ρ^8 · sin8θ |
| 46 | 9 | 9 | +ρ^9 · cos9θ |
| 47 | 9 | 7 | {+9ρ^9 −8ρ^7} cos7θ |
| 48 | 9 | 5 | {+36ρ^9 −56ρ^7 +21ρ^5} cos5θ |
| 49 | 9 | 3 | {+84ρ^9 −168ρ^7 +105ρ^5 −20ρ^3} cos3θ |
| 50 | 9 | 1 | {+126ρ^9 −280ρ^7 +210ρ^5 −60ρ^3 +5ρ} cosθ |
| 51 | 9 | −1 | {+126ρ^9 −280ρ^7 +210ρ^5 −60ρ^3 +5ρ} sinθ |
| 52 | 9 | −3 | {+84ρ^9 −168ρ^7 +105ρ^5 −20ρ^3} sin3θ |
| 53 | 9 | −5 | {+36ρ^9 −56ρ^7 +21ρ^5} sin5θ |
| 54 | 9 | −7 | {+9ρ^9 −8ρ^7} sin7θ |
| 55 | 9 | −9 | +ρ^9 · sin9θ |
| 56 | 10 | 10 | +ρ^10 · cos10θ |
| 57 | 10 | 8 | {+10ρ^10 −9ρ^8} cos8θ |
| 58 | 10 | 6 | {+45ρ^10 −72ρ^8 +28ρ^6} cos6θ |
| 59 | 10 | 4 | {+120ρ^10 −252ρ^8 +168ρ^6 −35ρ^4} cos4θ |
| 60 | 10 | 2 | {+210ρ^10 −504ρ^8 +420ρ^6 −140ρ^4 +15ρ^2} cos2θ |
| 61 | 10 | 0 | +252ρ^10 −630ρ^8 +560ρ^6 −210ρ^4 +30ρ^2 −1 |
| 62 | 10 | −2 | {+210ρ^10 −504ρ^8 +420ρ^6 −140ρ^4 +15ρ^2} sin2θ |
| 63 | 10 | −4 | {+120ρ^10 −252ρ^8 +168ρ^6 −35ρ^4} sin4θ |
| 64 | 10 | −6 | {+45ρ^10 −72ρ^8 +28ρ^6} sin6θ |
| 65 | 10 | −8 | {+10ρ^10 −9ρ^8} sin8θ |
| 66 | 10 | −10 | +ρ^10 · sin10θ |

Here, the sign ^ represents power, and, for example, ^2 means square. k is a mere serial number.

There will be described a method of determining the Zernike expanding coefficient Anm configured to allow calculation of the measured phases Ψs1(u, v), Ψs2(u, v), and . . . and the traced phases Ψt1(u, v), Ψt2(u, v), and . . . in the form of the phase Ψ(ρ, θ) shown in FIG. 7a.

However, as described above, since the Zernike expanding coefficient is defined only inside the unit circle, it is necessary to previously determine a coordinate conversion function configured to convert the coordinates (u, v) on the phase defining plane (T) into the coordinates (α, β) which is connected to the polar coordinates (ρ, θ) by the formula (12) and in which α^2+β^2≤1.

In the following description, for ease of explanation, when the Zernike polynomial expanding of the measured phase distributions . . . , Ψsj(u, v), and . . . and the traced phase distributions . . . , Ψtj(u, v), and . . . is described, even if not explicitly referred to, it is premised that the coordinates (u, v) and the coordinates (α, β) are matched applying the coordinate conversion function.

As already known, the Zernike polynomial has such a feature that Zernike polynomials are perpendicular to each other in a unit circle, that is, integration in a unit circle of a product of two Zernike polynomials Znm(ρ, θ) and Zn'm'(ρ, θ) is 0 when pairs of orders n, m and n', m' are not the same.

When the pairs of orders n, m and n', m' are the same as each other, the product, that is, a square integration value Snm=π/(n+1) when the auxiliary order m is 0, and Snm=π/2(n+1) when the auxiliary order m is not 0.

The Zernike expanding coefficient Anm can be determined by using the orthogonality.

Namely, when any Zernike polynomial of the formula (13), for example, the k-th Zernike polynomial in the serial number is selected, a product of a value of the measured phase distribution Ψsj(u, v) or the traced phase distribution Ψtj(u, v) desired to be expanded in the coordinates (α, β) and a value of the k-th Zernike polynomial Znm(ρ, θ) in the same coordinates (α, β) (using coordinate conversion (α, β)→(ρ, θ) based on the formula (12)) is subjected to numerical integration in a unit circle, that is, the range of α^2+β^2≤1. The Zernike expanding coefficient Anm corresponding to the k-th Zernike polynomial Znm(ρ, θ) can be obtained by dividing the calculated integrated value by the square integration value Snm corresponding to the k-th Zernike polynomial Znm(ρ, θ).

For example, if the Zernike polynomial expanding is performed in a range of n=0, 1, . . . , and 8, paying an attention to 45 serial numbers corresponding to the serial numbers k=1, 2, . . . , and 45 of the formula (13), the acquisition of the Zernike expanding coefficient Anm corresponding to the k-th Zernike polynomial Znm(ρ, θ) may be applied to k=1 to 45.

There is a method of obtaining an expanding coefficient by solving an equation other than the above method using numerical integration.

FIG. 7a is abbreviated as the following formula (14):

$$\Psi(\alpha, \beta) = \Sigma k\{Ak \cdot Zk(\alpha, \beta)\}.$$

Here, the sum $\Sigma$ is performed based on the serial number k instead of the pair of the orders n, m, and expression at the coordinates represented explicitly is changed to $(\alpha, \beta)$, premising that the coordinate conversion $(\alpha, \beta) \rightarrow (\rho, \theta)$ is used.

Similarly to the above, if expanding is performed by the 45 Zernike polynomials corresponding to the serial numbers k=1, 2, . . . , and 45, since values of 45 Zernike expanding coefficients Ak may be determined, suitable 45 coordinates $(\alpha i, \beta i)$ i=1, 2, . . . , and 45 holding the measured phase distribution $\Psi sj(u, v)$ or the traced phase distribution $\Psi tj(u, v)$ desired to be expanded are selected, and a value of a phase is extracted from data of the measured phase distribution $\Psi sj(u, v)$ or the traced phase distribution $\Psi tj(u, v)$ at the coordinates and set to be the left side of the formula (14). If calculation in which a Zernike polynomial $Z(\alpha, \beta)$ on the right side is based on the coordinates $(\alpha i, \beta i)$ is performed, the following formula (15) comprising 45 formulae according to a linear combination of 45 unknowns Ak k=1, 2, . . . , and 45 is obtained:

$$\Psi(\alpha 1, \beta 1) = \Sigma k\{Ak \cdot Zk(\alpha 1, \beta 1)\}$$

$$\Psi(\alpha 2, \beta 2) = \Sigma k\{Ak \cdot Zk(\alpha 2, \beta 2)\}$$

. . .

$$\Psi(\alpha i, \beta i) = \Sigma k\{Ak \cdot Zk(\alpha i, \beta i)\}$$

. . .

Since this is a simultaneous linear equation in which the number of the unknowns and the number of the formulae are the same, it can be solved, and thus, all values of the 45 Zernike expanding coefficients Ak can be determined.

Alternatively, more than 45 coordinates $(\alpha i, \beta i)$, for example, the coordinates with the number four to five times are selected, and the 45 Zernike expanding coefficients Ak may be determined by a least-squares method (reference: Chapter 8 of "Shinban suchikeisan hando-bukku (New Edition of Numerical Calculation Handbook)", edited by Yutaka OHNO and Kazuo ISODA, Ohmsha, Sep. 1, 1990, first edition, first issue).

This will be hereinafter briefly described.

For example, the 180 coordinates $(\alpha i, \beta i)$ are taken. The number is four times 45 as the maximum number of k. The number of the coordinates is referred to as I for the sake of simplicity.

In order to determine the coefficient Ak for the unknown of the right side of the formula (14), when there is the measured value $\Psi(\alpha i, \beta i)$ of $\Psi(\alpha, \beta)$ at the coordinates $(\alpha i, \beta i)$ corresponding to i=1, 2, . . . , and I, an error (square sum of the error) from true values of them is minimized, and in accordance with teaching of the least-squares method, the following formula (16) corresponding to each k of k=1 to 45 and comprising 45 formulae is to be solved as a simultaneous linear equation:

$$\Sigma j[\Sigma i\{Zj(\alpha i, \beta i) \cdot Zk(\alpha i, \beta i)\}] \cdot Aj = \Sigma i \Psi(\alpha i, \beta i) \cdot Zk(\alpha i, \beta i) \quad (k=1 \text{ to } 45).$$

Here, $\Sigma i$ represents a sum of i=1, 2, . . . , and I, and $\Sigma j$ represents a sum of j=1, 2, . . . , and 45.

Although the formula (15) is somewhat hard to understand, the inside of [ ] of the left side is a numerical value depending on k and a coefficient multiplied to Aj, and thus, the left side is a linear combination of 45 Aj. The right side is also a numerical value depending on k and means that 45 such formulae are present.

When this is visually represented, it is found that the formula 15 is the following formula when a mark □ is a numerical value depending on k:

$$K=1: \square \cdot A1 + \square \cdot A2 + \ldots + \square \cdot A45 = \square$$

$$K=2: \square \cdot A1 + \square \cdot A2 + \ldots + \square \cdot A45 = \square$$

. . .

$$K=45: \square \cdot A1 + \square \cdot A2 + \ldots + \square \cdot A45 = \square.$$

Namely, since the formula 15 is a simultaneous linear equation including 45 unknowns Aj and comprising 45 formulae, Aj j=1, 2, . . . , and 45 can be determined by solving this simultaneous linear equation.

In the above description, although there has been described the example in which in the formula (13), when the Zernike polynomial expanding in the range of the main order n=0, 1, . . . , and 8 is adopted, 45 serial numbers corresponding to the serial numbers k=1, 2, . . . , and 45 are handled, the number of the main orders to be adopted may be determined according to accuracy desired to be achieved.

For example, when it is determined that the main order n is up to 6, the serial number k may be up to 28. When it is determined that the main order n is up to 10, the serial number k may be up to 66.

Hereinabove, the optical system phase acquisition method of this invention has been described. Next, image forming simulation of an optical system to which the optical system phase acquisition method of this invention, which is one of optical system evaluation methods, is applied will be described.

In an optical system, when, in addition to aberration as designed, there are error in profile of a refractive surface or a reflective surface of each image forming optical element and defects such as eccentricity, surface distance error, and assembly error such as tilt, in evaluating how the performance is affected thereby, for example, in order to inspect how much the optical system can decompose fine image information to input (read) or output (write) the information, a resolution test chart in which a pattern according to a metallized film is formed on a glass substrate by applying a lithography technique is used.

However, in this invention, instead of optically inputting and outputting the resolution test chart, a virtual input pattern corresponding to image contents of the resolution test chart and serving as a set of virtual light emitting points located at coordinates (x1, y1, z1), (x2, y2, z2), and . . . in a virtual input image spatial coordinate system (x, y, z) is held as data in a calculator.

Here, the light emitting point is based on thinking that an image seen for example when a transmission type test chart is illuminated from the back side, or a reflection type test chart is illuminated from the front side is handled as a set of the light emitting points and is not limited to a point emitting light in itself.

In the optical system (Ot) to be evaluated, when there is executed the process described in the first invention for providing the extant input image points (Ps1, Ps2, Psj, . . . ) with respect to the input side of the optical system (Ot) to acquire the interference image data (Df) with respect to each of the extant input image points and determining and holding the expanding coefficients Ajn n=0, 1, 2, . . . belonging to each of the extant input image points (Ps1, Ps2, . . . , Psj, . . . ), with the use of the above method described as the first or second invention (naturally, when design data of the optical system (Ot) is known and the method according to the second invention is used, the group of the expanding coefficients Bjn n=0, 1, 2, . . . by the ray tracing simulation is held as data), the phase distributions Ψ1(u, v), Ψ2(u, v), and . . . on the phase defining plane (T) with respect to the virtual light emitting points located at the coordinates (x1, y1, z1), (x2, y2, z2), and . . . included in the set of the virtual light emitting points can be determined.

Accordingly, the diffractive optical light propagation simulation from the phase defining plane (T) to the prescribed output image plane (Ho) is performed for each of the determined phase distributions Ψ1(u, v), Ψ2(u, v), and . . . , whereby light electric field distributions e1(X, Y), e2(X, Y), and . . . on the output image plane (Ho) formed by each of the virtual light emitting points located at the coordinates (x1, y1, z1), (x2, y2, z2), and . . . can be calculated.

However, depending on whether an input image set assumed in the simulation, that is, light emission of the virtual input pattern (or illumination light with respect to the test chart) is coherent or noncoherent, difference in handling of the calculated light electric field distributions e1(X, Y), e2(X, Y), and . . . occurs.

When it is coherent, after a phase difference in light emission of each of the virtual light emitting points located at the coordinates (x1, y1, z1), (x2, y2, z2), and . . . is added to each of the calculated light electric field distributions e1(X, Y), e2(X, Y), and . . . , the superimposed light electric field distributions of complex numbers are calculated. After all superimposition processing is terminated, light intensity distribution is calculated by squaring light electric field amplitude.

Here, a phase difference of each virtual light emitting point depends on an angle of illumination to a test chart. For example, when a transmission type test chart placed vertical to an optical axis is irradiated with coherent parallel light in the optical axis direction from the back side, there is no phase difference.

On the other hand, when it is noncoherent, light intensity distribution in which squared amplitudes of the calculated light electric field distributions e1(X, Y), e2(X, Y), and . . . are superimposed is calculated.

In the above description, there has been described that after the phases Ψ1(u, v,), Ψ2(u, v,), . . . Ψj(u, v,), and . . . , which are two-dimensional array data, are acquired with respect to all j, the light electric field distributions e1(X, Y), e2(X, Y), ej(u, v), and . . . with respect to each j are acquired. However, for ease of understating, the process for acquiring the measured phase distribution and the process for acquiring the group of the expanding coefficients have been separately described. In carrying out this invention, acquisition of the light electric field distributions e1(X, Y), e2(X, Y), . . . , ej(u, v), and . . . immediately after acquisition of the measured phase distribution Ψsj (u, v) may be applied to each of the virtual light emitting points located at the coordinates (x1, y1, z1), (x2, y2, z2), . . . , (xj, yj, zj), and . . . , and this method is more advantageous in terms of eliminating a period during which all the phases Ψ1(u, v), Ψ2(u, v), . . . , Ψj(u, v), and . . . are held simultaneously.

Hereinabove, it has been mentioned that in order to evaluate an optical system when, in addition to aberration as designed, there are error in profile of a refractive surface or a reflective surface of each image forming optical element and defects such as eccentricity, surface distance error, and assembly error such as tilt, the resolution test chart is optically input and output, and the method of applying image forming simulation thereto based on this invention has been described. However, in some cases, a numerical value which is an index of a performance associated with the resolution needs to be calculated to perform quantitative evaluation.

For example, in a case of an electrical circuit amplifier, in order to examine how gain of an output signal or a phase delay changes as a frequency of an input signal of a sine wave increases, a transfer function based on Fourier transform calculation is evaluated.

In a case of an image forming optical system, in order to examine how a contrast of an output image and a phase shift change as a spatial frequency of an input image increases, an optical transfer function similarly based on Fourier transform calculation, that is, OTF (reference: M. Born, E. Wolf (translated by Toru KUSAKAWA and Hideshi YOKOTA): Principles of Optics II, published by the Tokai University, Dec. 20, 1980, fourth issue, 9.5) is evaluated.

However, in the case of the electrical circuit amplifier, unless waveform distortion due to nonlinear response is considered, monotonous repetition of a sinusoidal waveform just continues. Thus, although there is only one transfer function, in a case of an optical system, the resolution changes depending on a place of a screen, and therefore, it is different in that OTF is required to be calculated for each place when a plurality of places desired to be evaluated are present on a screen.

Hereinafter, a calculation method for OTF evaluation in an optical system to which the optical system phase acquisition method of this invention, which is one of optical system evaluation methods, is applied will be described.

As a place on a screen desired to be evaluated, a virtual light emitting point located at the coordinates (x, y, z) in the virtual input image spatial coordinate system (x, y, z) will be considered.

In the optical system (Ot) to be evaluated, when there is executed the process described in the first invention for providing the extant input image points (Ps1, Ps2, Psj, . . . ) with respect to the input side of the optical system (Ot) to acquire the interference image data (Df) with respect to each of the extant input image points and determining and holding the expanding coefficients Ajn n=0, 1, 2, . . . belonging to each of the extant input image points (Ps1, Ps2, . . . , Psj, . . . ), with the use of the above method described as the first or second invention (naturally, when design data of the optical system (Ot) is known and the method according to the second invention is used, the group of the expanding coefficients Bjn n=0, 1, 2, . . . by the ray tracing simulation is held as data), the phase distribution Ψr (u, v) on the phase defining plane (T) with respect to a virtual light emitting point located at coordinates (xr, yr, zr) can be determined.

However, in order to acquire OTF, optical path length aberration distribution is required to be obtained based on phase distribution.

Figure 6:
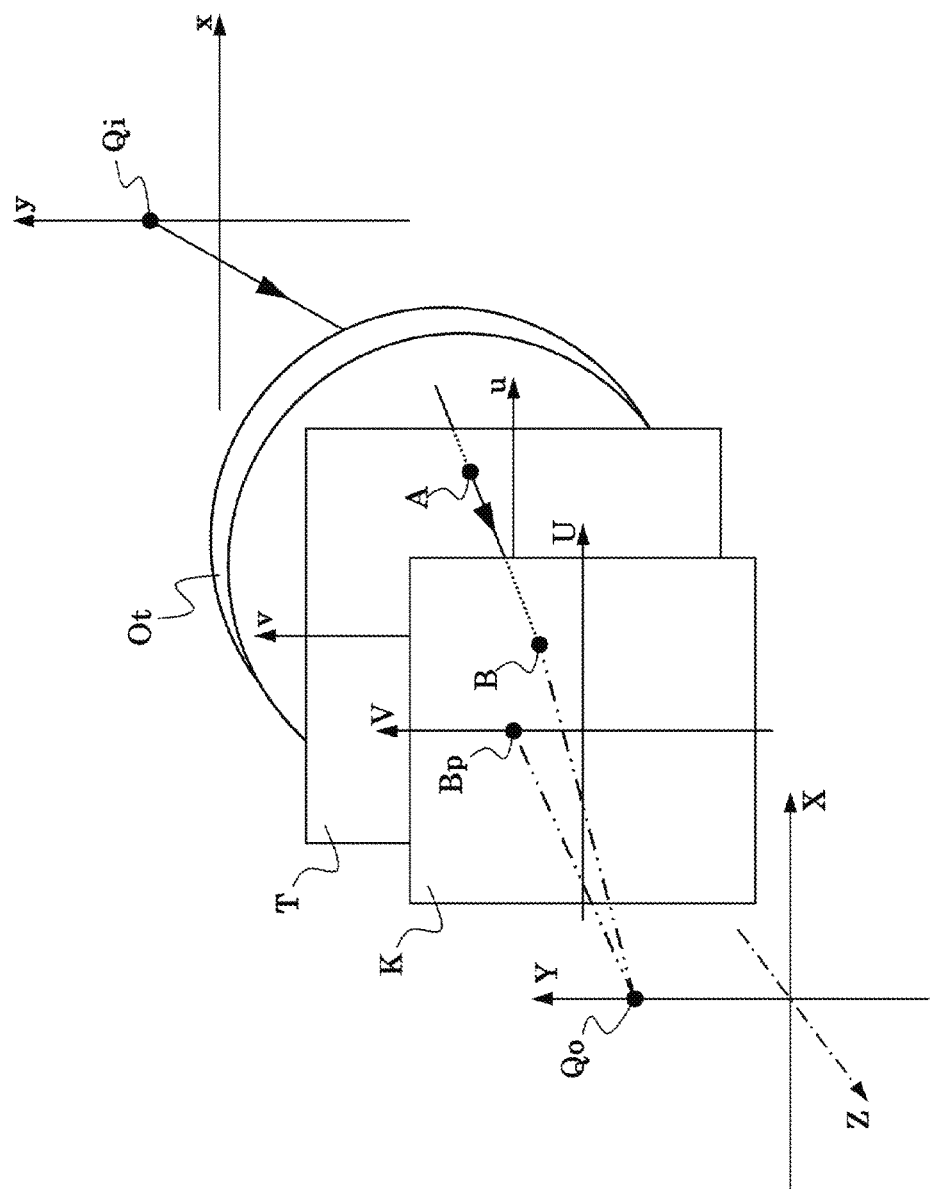
FIG. 6 is a schematic diagram of a concept associated with the technique of the optical system phase acquisition method of this invention.

Here, as shown in FIG. 6 which is a schematic diagram of a concept associated with the technique of the optical system phase acquisition method of this invention, with respect to a sum $\Gamma(U, V)+\Gamma_o(U, V)$ of an optical path length $\Gamma(u, v)$ extending to a point (B) at coordinates (U, V) in which a ray emitted from an input image point (Qi) passes through the optical system (Ot) to reach an aberration defining virtual plane (K) arbitrarily provided and thus to intersect and a virtual optical path length $\Gamma_o(U, V)$ of a virtual ray, which extends from the point (B) to an ideal output image point (Qo) conjugate to the input image point (Qi), optical path length aberration H(U, V) is defined by a difference from that of a main ray, that is, the following formula (17):

$$H(U, V)=\Gamma(U, V)+\Gamma_o(U, V)-(\Gamma_p+\Gamma_{op}).$$

However, $\Gamma_p$ is an optical path length extending to a point (Bp) in which a main ray emitted from the input image point (Qi) reaches the aberration defining virtual plane (K) and thus to intersect, and $\Gamma_{op}$ is a virtual optical path length of a virtual main ray from the point (Bp) to the ideal output image point (Qo).

The term "ideal" of the ideal output image point (Qo) means that the position is predicted by an aplanatic paraxial theory.

In FIG. 6, for facilitating understanding of a main ray, the input image point (Qi) and the ideal output image point (Qo) are illustrated so as to be located on y and Y axes. However, this invention is not limited thereto in actual application.

In the above case, the virtual light emitting point located at the coordinates (xr, yr, zr) corresponds to the input image point (Qi).

Although FIG. 6 illustrates a case where the aberration defining virtual plane (K) is a plane vertical to an optical axis located more backward than the phase defining plane (T), the aberration defining virtual plane (K) may be the same as the phase defining plane (T) or may be a plane vertical to the virtual main ray or a spherical surface centered on the ideal output image point (Qo). Particularly, in this case, the optical path length aberration is referred to as wavefront aberration.

When the aberration defining virtual plane (K) is set to be the same as the phase defining plane (T), the optical path length $\Gamma(U, V)$ can be directly obtained from the phase distribution $\Psi r(u, v)$ on the phase defining plane (T) by dividing it by wavenumber, as described above.

However, when the aberration defining virtual plane (K) is not the same as the phase defining plane (T), as described above, phase distribution on the aberration defining virtual plane (K) is temporarily acquired by diffractive optical light propagation simulation from the phase defining plane (T) to the aberration defining virtual plane (K), and the optical path length $\Gamma(U, V)$ may be obtained.

Hereinafter, for ease of handling, the aberration defining virtual plane (K) is set to be the same as the phase defining plane (T), and, as described above, the case where the phase defining plane (T) is taken with respect to an exit pupil of the optical system (Ot) will be described.

A pupil function represented by the following formula (18) including the optical path length aberration distribution H(U, V) is defined:

$$G(U, V) = E(U, V) \exp\{-2\pi i H(U, V)/\lambda\}.$$

Here, E(U, V) is a function whose value is 0 at a position corresponding to outside of the exit pupil. When illumination distribution or transmittance distribution is present in a pupil, if distribution of amplitude, a phase filter, or the like is present, E(U, V) can include it as a function having distribution of phase shift. i is an imaginary unit.

In the input image spatial coordinates, if an input image on a plane in which the z coordinates are constant is considered, and accordingly, if an output image on a plane conjugate to the relevant plane is considered, while the spatial frequency in the X direction on an output image plane X, Y is written as m, the spatial frequency in the Y direction is written as n. In this case, OTF is represented as a function of m and n.

When an input image set is coherent, OTF can be calculated by the following formula (19):

$$OTF(m, n) = G(\lambda L m + X, \lambda L n + Y).$$

However, L represents a length of a path extending from the point (Bp) to the ideal output image point (Qo) and extending along a virtual main ray.

When the input image set is noncoherent, OTF can be calculated by autocorrelation integration of the following formula (20):

$$OTF(m, n) = \iint G(\lambda L(m+m'), \lambda L(n+n')) \cdot G\sim(\lambda L m', \lambda L n') \, dm' dn'.$$

However, an integration region is from $-\infty$ to $+\infty$, and the mark $\sim$ represents a complex conjugate.

In an optical system, when there are the aberration and the defects, as the degree deteriorates, OTF is rapidly reduced with respect to an increase in a spatial frequency m, n. Therefore, this invention can be applied to evaluation of the optical system (Ot).

The influence of the aberration and the defects on the performance of the optical system becomes larger as it approaches a periphery of a screen, and therefore, it is preferable that the input image points (Qi) are set at positions around the optical axis, which correspond to a maximum field angle according to specifications, and OTF with respect to each position is evaluated.

Hereinabove, although the case where OTF is obtained and evaluated has been described as an example in which the optical system (Ot) is evaluated based on the optical path length aberration distribution H(U, V), the optical path length aberration distribution H(U, V) belonging to the input image point (Qi) obtained by the formula (17) is subjected to the Zernike polynomial expanding, and the optical system (Ot) may be evaluated by the magnitude of the expanding coefficient for each serial number k, for example.

As a calculation method for Zernike polynomial expanding, a calculation similar to that described above for Zernike polynomial expanding of the measured phases $\Psi s1(u, v)$, $\Psi s2(u, v)$, and . . . and the traced phases $\Psi t1(u, v)$, $\Psi t2(u, v)$, and . . . may be applied to the optical path length aberration distribution H(U, V).

Since the Zernike polynomial of each k corresponds to aberration classified based on aberrations, the magnitude of the Zernike expanding coefficient Anm of certain k represents the magnitude of aberration of classification corresponding to the relevant k, and thus the optical system (Ot) can be evaluated by the magnitude of the Zernike expanding coefficient.

Hereinabove, as an embodiment of the optical system evaluation method of this invention, the method applied to evaluation using OTF and Zernike polynomial expanding has been described. However, since acquisition of the optical path length aberration distribution H(U, V) of the optical system based on this invention is equal to observation of the optical system with an interferometer, this invention is applicable to all optical system evaluation techniques using the interferometer.

The invention is applicable in industry of effectively using a method of performing diffractive optical image forming simulation with respect to, for example, an arbitrary input image pattern, including a case where a lens inspection device or the like includes aberration as designed, error in profile of a refractive surface or a reflective surface of each image forming optical element, and defects such as eccentricity, surface distance error, and assembly error such as tilt, calculating OTF and Zernike expanding coefficients, and thereby acquiring an optical phase and the distribution of the optical phase that are useful when an optical system is evaluated.

What is claimed is:

1. An optical system generalized phase distribution calculation method of calculating, by a processing apparatus (Up), a generalized phase distribution $\Psi(u, v)$, which is information corresponding to a phase distribution on a phase defining plane (T) in a virtual optical system having an optical system (Ot) comprising one or more image forming optical elements, a virtual light emitting point that virtually illuminates the optical system (Ot), and the virtual phase defining plane (T) located at a prescribed relative position with respect to an output side of the optical system (Ot), the method comprising:

(a1) arranging the optical system (Ot) and an imaging element (Uf);

(a2) arranging one or more light sources (Psj) (j =1, 2, . . . ; the same applies hereinafter) at spatial coordinates (xsj, ysj, zsj) on an opposite side of the imaging element (Uf) as viewed from the optical system (Ot);

(a3) illuminating the optical system (Ot) with an illumination light flux (Fsj) emitted from each of the light sources (Psj) and guiding a real output light flux output from the optical system (Ot) to the imaging element (Uf);

(a4) superimposing reference light flux (Fr), which is a light flux coherent with the real output light flux, on the real output light flux to generate an interference image, and, at the same time, imaging the interference image with the imaging element (Uf) to acquire interference image data (Df), and transmitting the interference image data (DO to the processing apparatus (Up);

(b) after performing processing of steps (a2) to (a4) one or more times, calculating measured generalized phase distributions $\Psi_{sj}(u, v)$, which belong to each of the light sources (Psj) on the phase defining plane (T) and are information corresponding to the generalized phase distribution based on measured data, based on the interference image data (Df) by calculation processing by the processing apparatus (Up);

(c) calculating a group of expanding coefficients Ajn belonging to each of the light sources (Psj) and configured to expand each of the measured generalized phase distributions $\Psi_{sj}(u, v)$ by expanding functions $\mu_n(u, v)$ having coordinates (u, v) on the phase defining plane (T) as a variable and represent a resultant sum as a sum with coefficients $\Sigma_n\{A_{jn}\cdot\mu_n(u, v)\}$, by the calculation processing by the processing apparatus (Up);

(d) when the virtual light emitting point is virtually disposed at spatial coordinates (x, y, z), applying interpolation calculation to the group of expanding coefficients Ajn based on a position occupied by spatial coordinates (x, y, z) at the virtual light emitting point among a set of spatial coordinates (xsj, ysj, zsj) of the light sources (Psj) to calculate a group of interpolation expanding coefficients An, which are values of the expanding coefficients after interpolation processing, by the calculation processing by the processing apparatus (Up); and (e) determining the sum with coefficients $\Sigma_n\{A_{jn}\cdot\mu_n(u, v)\}$ of the expanding functions $\mu_n(u, v)$ based on a value of an interpolation expanding coefficient An calculated in step (d) to a value of specific coordinates (u, v) on the phase defining plane (T), and, at the same time, calculating the generalized phase distribution $\Psi(u, v)$ based on a determination result, by the calculation processing by the processing apparatus (Up).

2. The optical system generalized phase distribution calculation method according to claim 1, wherein in step (b), when the processing of steps (a2) to (a4) is performed a plurality of times, the interference image data (Df) acquired by dividing for each of the light sources (Psj) is used.

3. The optical system generalized phase distribution calculation method according to claim 1, wherein
step (a4) further comprises a step of collectively acquiring all the interference image data (Df) of the light sources (Psj), and
in step (b), the measured generalized phase distribution $\Psi_{sj}(u, v)$ for each of the light sources (Psj) is separated and calculated based on all the interference image data (Df) of the light sources (Psj) collectively acquired in step (a4).

4. The optical system generalized phase distribution calculation method according to claim 1, further comprising:
(a5) disposing a relay optical system (Oq) between the optical system (Ot) and the imaging element (Uf), wherein
step (a3) is a step of guiding the real output light flux, which has been output from the optical system (Ot) and has passed through the relay optical system (Oq), to the imaging element (Uf).

5. The optical system generalized phase distribution calculation method according to claim 1, wherein the expanding by coefficients in step (c) is Zernike polynomial expanding.

6. An optical system evaluation method of evaluating the optical system (Ot) by calculation by a processing apparatus (Up) with use of the optical system generalized phase distribution calculation method according to claim 1, the method further comprising:

(m1) when a virtual input pattern to be subjected to image forming simulation is represented by a set of virtual light emitting points virtually located at spatial coordinates (xj, yj, zj), calculating the generalized phase distribution $\Psi_j(u, v)$ on the phase defining plane (T) with respect to the virtual light emitting points included in the set of the virtual light emitting points by acquiring the generalized phase distribution $\Psi(u, v)$ by the method according to claim 1, by calculation processing by the processing apparatus (Up);

(m2) performing diffractive optical light propagation simulation from the phase defining plane (T) to a prescribed output image plane (Ho) to calculate light electric field distributions $e_j(X, Y)$ on the output image plane (Ho) formed by each of the virtual light emitting points located at the spatial coordinates (xj, yj, zj), by the calculation processing by the processing apparatus (Up); and (m3) superposing each of the light electric field distributions $e_j(X, Y)$ to calculate an output pattern, by the calculation processing by the processing apparatus (Up).

7. An optical system evaluation method of evaluating the optical system (Ot) by calculation by a processing apparatus (Up) with use of the optical system generalized phase distribution calculation method according to claim 1, the method further comprising:

(n1) calculating the generalized phase distribution $\Psi_r(u, v)$ on the phase defining plane (T) with respect to the virtual light emitting point virtually located at spatial coordinates (xr, yr, zr) by acquiring the generalized phase distribution $\Psi(u, v)$ by the method according to claim 1, by calculation processing by the processing apparatus (Up);

(n2) calculating an optical path length from a position of coordinates (U, V) on an aberration defining virtual plane arbitrarily provided to an ideal output image point located at coordinates (Xr, Yr, Zr) conjugate to the virtual light emitting point located at the spatial coordinates (xr, yr, zr), and, at the same time, calculating an optical path length aberration distribution $H(U, V)$ on the aberration defining virtual plane, based on the optical path length and the generalized phase distribution $\Psi r(u, v)$, by the calculation processing by the processing apparatus (Up); and (n3) evaluating the optical system (Ot) based on the optical path length aberration distribution $H(U, V)$, by the calculation processing by the processing apparatus (Up).

* * * * *